(12) United States Patent
Podgorny et al.

(10) Patent No.: US 10,755,294 B1
(45) Date of Patent: *Aug. 25, 2020

(54) METHOD AND SYSTEM FOR INCREASING USE OF MOBILE DEVICES TO PROVIDE ANSWER CONTENT IN A QUESTION AND ANSWER BASED CUSTOMER SUPPORT SYSTEM

(71) Applicant: Intuit Inc., Mountain View, CA (US)

(72) Inventors: Igor A. Podgorny, San Diego, CA (US); Kelvin Hung, San Diego, CA (US); Matthew Cannon, San Diego, CA (US); Warren Bartolome, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1115 days.

This patent is subject to a terminal disclaimer.

(21) Appl. No.: 14/698,425

(22) Filed: Apr. 28, 2015

(51) Int. Cl.
    *G06Q 30/02* (2012.01)
(52) U.S. Cl.
    CPC ................. *G06Q 30/0203* (2013.01)
(58) Field of Classification Search
    CPC .................................. G06Q 30/0203
    See application file for complete search history.

(56) References Cited

U.S. PATENT DOCUMENTS

| | | |
|---|---|---|
| 5,471,382 A | 11/1995 | Tallman et al. |
| 5,519,608 A | 5/1996 | Kupiec |
| 5,701,399 A | 12/1997 | Lee et al. |
| 6,006,218 A | 12/1999 | Breese et al. |
| 6,147,975 A | 11/2000 | Bowman-Amuah |

(Continued)

FOREIGN PATENT DOCUMENTS

| | | |
|---|---|---|
| AU | 2001259223 B2 | 11/2001 |
| CN | 101520802 | 4/2009 |

(Continued)

OTHER PUBLICATIONS

Dror, et al., "From Query to Question in One Click: Suggesting Synthetic Questions to Searchers," World Wide Web, International World Wide Web Conferences Steering Committee, Republic and Canton of Geneva, Switzerland; May 13, 2013, pp. 391-402.

(Continued)

*Primary Examiner* — Andre D Boyce
(74) *Attorney, Agent, or Firm* — Paradice and Li LLP

(57) ABSTRACT

Reduction in latency between question submissions and response submissions in a question and answer based customer support system is reduced by facilitating the use of mobile devices by customer support personnel to submit question responses. The answerability of a question from a mobile device is predicted by analyzing the attributes of the question itself before the answer is generated. Questions being entered into the question and answer based customer support system that are conveniently answerable from a mobile device are routed to a mobile question and answer queue that enables mobile device users to review and respond to the mobile device answerable questions. A question is determined to be answerable from a mobile device if a predicted answer to the question has a length that is within a predetermined threshold, so that customer support personnel are not burdened with generating long responses from mobile devices.

11 Claims, 10 Drawing Sheets

(56) References Cited

U.S. PATENT DOCUMENTS

| | | |
|---|---|---|
| 6,256,633 B1 | 7/2001 | Dharap |
| 6,349,307 B1 | 2/2002 | Chen |
| 6,513,036 B2 | 1/2003 | Fruensgaard et al. |
| 6,564,213 B1 | 5/2003 | Ortega et al. |
| 6,601,055 B1 | 7/2003 | Roberts |
| 6,708,172 B1 | 3/2004 | Wong et al. |
| 6,853,982 B2 | 2/2005 | Smith et al. |
| 7,013,263 B1 | 3/2006 | Isaka et al. |
| 7,222,078 B2 | 5/2007 | Abelow |
| 7,385,716 B1 | 6/2008 | Skaanning |
| 7,565,312 B1 | 7/2009 | Shaw et al. |
| 7,587,387 B2 | 9/2009 | Hogue |
| 7,594,176 B1 | 9/2009 | English |
| 7,603,301 B1 | 10/2009 | Regan |
| 7,610,226 B1 | 10/2009 | Miller |
| 7,627,504 B2 | 12/2009 | Brady et al. |
| 7,685,144 B1 | 3/2010 | Katragadda |
| 7,739,286 B2 | 6/2010 | Sethy et al. |
| 7,747,601 B2 | 6/2010 | Cooper et al. |
| 7,966,282 B2 | 6/2011 | Pinckney et al. |
| 7,974,860 B1 | 7/2011 | Travis |
| 8,010,545 B2 | 8/2011 | Stefik et al. |
| 8,019,753 B2 | 9/2011 | Podgorny et al. |
| 8,200,527 B1 | 6/2012 | Thompson et al. |
| 8,209,333 B2 | 6/2012 | Hubbard et al. |
| 8,311,792 B1 | 11/2012 | Podgorny et al. |
| 8,311,863 B1 | 11/2012 | Kemp |
| 8,341,167 B1 | 12/2012 | Podgorny et al. |
| 8,473,339 B1 | 6/2013 | McKennon et al. |
| 8,478,780 B2 | 7/2013 | Cooper et al. |
| 8,484,228 B2 | 7/2013 | Bhattacharyya et al. |
| 8,631,006 B1 | 1/2014 | Haveliwala et al. |
| 8,645,298 B2 | 2/2014 | Hennig et al. |
| 8,660,849 B2 | 2/2014 | Gruber et al. |
| 8,732,222 B2 | 5/2014 | Horvitz et al. |
| 8,805,734 B2 | 8/2014 | Diana et al. |
| 8,817,968 B1* | 8/2014 | Boutcher ............... H04W 4/14 379/265.01 |
| 8,850,490 B1 | 9/2014 | Thomas et al. |
| 8,892,539 B2 | 11/2014 | Anand et al. |
| 8,909,568 B1 | 12/2014 | Mann et al. |
| 8,935,192 B1 | 1/2015 | Ventilla et al. |
| 8,943,145 B1 | 1/2015 | Peters et al. |
| 8,983,977 B2 | 3/2015 | Ishikawa et al. |
| 9,015,031 B2 | 4/2015 | Ferrucci et al. |
| 9,037,578 B2 | 5/2015 | Brust et al. |
| 9,060,062 B1 | 6/2015 | Madahar et al. |
| 9,063,983 B1 | 6/2015 | Lee |
| 9,229,974 B1 | 1/2016 | Lee et al. |
| 9,235,626 B2 | 1/2016 | Liu et al. |
| 9,247,066 B1* | 1/2016 | Stec ............... H04M 3/5235 |
| 9,336,211 B1 | 5/2016 | Bousquet et al. |
| 9,336,269 B1 | 5/2016 | Smith et al. |
| 9,342,608 B2 | 5/2016 | Cook et al. |
| 9,460,191 B1 | 10/2016 | Gaucher et al. |
| 9,471,883 B2 | 10/2016 | Chatterjee et al. |
| 9,582,757 B1 | 2/2017 | Holmes et al. |
| 9,633,309 B2 | 4/2017 | Giffels et al. |
| 9,767,169 B1 | 9/2017 | Paff et al. |
| 9,779,388 B1 | 10/2017 | Hansen et al. |
| 9,887,887 B2 | 2/2018 | Hunter et al. |
| 9,892,367 B2 | 2/2018 | Guo et al. |
| 9,910,886 B2 | 3/2018 | Adams, Jr. et al. |
| 10,002,177 B1 | 6/2018 | McClintock et al. |
| 10,083,213 B1 | 9/2018 | Podgorny et al. |
| 10,134,050 B1 | 11/2018 | Hung et al. |
| 10,147,037 B1 | 12/2018 | Podgorny et al. |
| 10,162,734 B1 | 12/2018 | Podgorny et al. |
| 10,210,244 B1 | 2/2019 | Branavan et al. |
| 10,354,182 B2 | 7/2019 | Chang et al. |
| 10,460,398 B1 | 10/2019 | Gielow et al. |
| 10,475,044 B1 | 11/2019 | Cannon et al. |
| 10,522,134 B1 | 12/2019 | Matsoukas |
| 10,552,843 B1 | 2/2020 | Podgorny et al. |
| 10,579,625 B2 | 3/2020 | Cho et al. |
| 2002/0087387 A1 | 7/2002 | Calver et al. |
| 2002/0111888 A1 | 8/2002 | Stanley et al. |
| 2002/0111926 A1 | 8/2002 | Bebie |
| 2002/0123983 A1 | 9/2002 | Riley et al. |
| 2002/0169595 A1 | 11/2002 | Agichtein et al. |
| 2003/0028448 A1 | 2/2003 | Joseph et al. |
| 2003/0061131 A1 | 3/2003 | Parkan |
| 2003/0099924 A1 | 5/2003 | Tsuboi et al. |
| 2003/0101161 A1 | 5/2003 | Ferguson et al. |
| 2003/0144873 A1* | 7/2003 | Keshel ............... G06Q 30/02 705/1.1 |
| 2004/0024739 A1 | 2/2004 | Copperman et al. |
| 2004/0064442 A1 | 4/2004 | Popovitch |
| 2005/0086290 A1 | 4/2005 | Joyce et al. |
| 2005/0114327 A1 | 5/2005 | Kumamoto et al. |
| 2005/0137939 A1 | 6/2005 | Calabria et al. |
| 2005/0246314 A1 | 11/2005 | Eder |
| 2006/0064322 A1 | 3/2006 | Mascarenhas et al. |
| 2006/0074788 A1 | 4/2006 | Grizack et al. |
| 2006/0085255 A1 | 4/2006 | Hastings et al. |
| 2006/0085750 A1 | 4/2006 | Easton et al. |
| 2006/0253578 A1 | 11/2006 | Dixon et al. |
| 2006/0265232 A1 | 11/2006 | Katariya et al. |
| 2007/0011131 A1 | 1/2007 | Delefevre |
| 2007/0192166 A1 | 8/2007 | Van Luchene |
| 2007/0192168 A1 | 8/2007 | Van Luchene |
| 2007/0192179 A1 | 8/2007 | Van Luchene |
| 2007/0219863 A1 | 9/2007 | Park et al. |
| 2007/0244900 A1 | 10/2007 | Hopkins et al. |
| 2007/0259325 A1 | 11/2007 | Clapper |
| 2007/0291739 A1 | 12/2007 | Sullivan et al. |
| 2007/0294195 A1 | 12/2007 | Curry et al. |
| 2008/0189197 A1 | 8/2008 | Allanson et al. |
| 2008/0201413 A1 | 8/2008 | Sullivan et al. |
| 2008/0208610 A1 | 8/2008 | Thomas et al. |
| 2008/0215541 A1 | 9/2008 | Li et al. |
| 2008/0248815 A1 | 10/2008 | Busch |
| 2008/0294637 A1 | 11/2008 | Liu |
| 2009/0012926 A1 | 1/2009 | Ishikawa et al. |
| 2009/0077047 A1 | 3/2009 | Cooper et al. |
| 2009/0089286 A1 | 4/2009 | Kumar et al. |
| 2009/0119575 A1 | 5/2009 | Velusamy |
| 2009/0158143 A1 | 6/2009 | Arav |
| 2009/0162824 A1 | 6/2009 | Heck |
| 2009/0198667 A1 | 8/2009 | Groeneveld et al. |
| 2009/0248659 A1 | 10/2009 | McCool et al. |
| 2009/0253112 A1 | 10/2009 | Cao et al. |
| 2009/0259642 A1 | 10/2009 | Cao et al. |
| 2009/0265340 A1 | 10/2009 | Barcklay et al. |
| 2009/0292609 A1 | 11/2009 | Vaidyanathan |
| 2010/0068687 A1 | 3/2010 | Bertelsen |
| 2010/0070554 A1 | 3/2010 | Richardson et al. |
| 2010/0076847 A1 | 3/2010 | Heller |
| 2010/0076998 A1 | 3/2010 | Podgorny et al. |
| 2010/0088262 A1 | 4/2010 | Visel et al. |
| 2010/0138451 A1 | 6/2010 | Henkin et al. |
| 2010/0185630 A1 | 7/2010 | Cheng et al. |
| 2010/0191686 A1 | 7/2010 | Wang et al. |
| 2010/0203492 A1 | 8/2010 | Nibe et al. |
| 2010/0205180 A1 | 8/2010 | Cooper et al. |
| 2010/0205550 A1 | 8/2010 | Chen et al. |
| 2010/0228744 A1 | 9/2010 | Craswell et al. |
| 2010/0235361 A1 | 9/2010 | Chandran et al. |
| 2010/0241971 A1 | 9/2010 | Zuber |
| 2010/0318919 A1 | 12/2010 | Murphy et al. |
| 2011/0055110 A1 | 3/2011 | Kolyvanov et al. |
| 2011/0055699 A1 | 3/2011 | Li et al. |
| 2011/0071997 A1 | 3/2011 | Sullivan et al. |
| 2011/0106895 A1 | 5/2011 | Ventilla et al. |
| 2011/0125734 A1 | 5/2011 | Duboue et al. |
| 2011/0202472 A1 | 8/2011 | Wan et al. |
| 2011/0231347 A1 | 9/2011 | Xu et al. |
| 2011/0246334 A1 | 10/2011 | Schoenberg et al. |
| 2011/0264569 A1 | 10/2011 | Houseworth et al. |
| 2011/0282892 A1 | 11/2011 | Castellani et al. |
| 2011/0295612 A1 | 12/2011 | Donneau-Golencer et al. |
| 2012/0005148 A1 | 1/2012 | Horvitz et al. |
| 2012/0005219 A1 | 1/2012 | Apacible et al. |
| 2012/0022983 A1 | 1/2012 | Hughes et al. |

(56) References Cited

U.S. PATENT DOCUMENTS

| | | |
|---|---|---|
| 2012/0030079 A1 | 2/2012 | Slater et al. |
| 2012/0077178 A1 | 3/2012 | Bagchi et al. |
| 2012/0084120 A1 | 4/2012 | Hirsch et al. |
| 2012/0084185 A1 | 4/2012 | Ciaramitaro et al. |
| 2012/0084279 A1 | 4/2012 | Driscoll et al. |
| 2012/0084293 A1 | 4/2012 | Brown et al. |
| 2012/0095976 A1 | 4/2012 | Hebenthal et al. |
| 2012/0101965 A1 | 4/2012 | Hennig et al. |
| 2012/0130910 A1 | 5/2012 | Al-Alami |
| 2012/0130978 A1 | 5/2012 | Li et al. |
| 2012/0136764 A1 | 5/2012 | Miller et al. |
| 2012/0150861 A1 | 6/2012 | Thione et al. |
| 2012/0166438 A1 | 6/2012 | Wu et al. |
| 2012/0219142 A1 | 8/2012 | Gould |
| 2012/0221557 A1 | 8/2012 | Edmonds et al. |
| 2012/0233191 A1 | 9/2012 | Ramanujam |
| 2012/0331052 A1 | 12/2012 | Rathod |
| 2013/0019286 A1 | 1/2013 | Barborak et al. |
| 2013/0024290 A1 | 1/2013 | Berg et al. |
| 2013/0054497 A1 | 2/2013 | Garland et al. |
| 2013/0066693 A1 | 3/2013 | Laird-McConnell et al. |
| 2013/0073387 A1 | 3/2013 | Heath |
| 2013/0073390 A1 | 3/2013 | Konig et al. |
| 2013/0103493 A1 | 4/2013 | Gao et al. |
| 2013/0110671 A1 | 5/2013 | Gray |
| 2013/0110823 A1 | 5/2013 | Su et al. |
| 2013/0111323 A1* | 5/2013 | Taghaddos ............ G06F 17/243 715/223 |
| 2013/0117677 A1 | 5/2013 | St Jacques, Jr. |
| 2013/0204876 A1 | 8/2013 | Szucs et al. |
| 2013/0224713 A1 | 8/2013 | Ajmera et al. |
| 2013/0268319 A1 | 10/2013 | Palombo |
| 2013/0275408 A1 | 10/2013 | Rodriguez et al. |
| 2013/0282363 A1 | 10/2013 | Fan et al. |
| 2013/0285855 A1 | 10/2013 | Dupray et al. |
| 2013/0297545 A1 | 11/2013 | Bierner et al. |
| 2013/0297553 A1 | 11/2013 | Bierner |
| 2013/0297625 A1 | 11/2013 | Bierner et al. |
| 2013/0304730 A1 | 11/2013 | Zhou |
| 2013/0325992 A1 | 12/2013 | McGann et al. |
| 2013/0339870 A1 | 12/2013 | Tandra Sishtla et al. |
| 2014/0006012 A1 | 1/2014 | Zhou et al. |
| 2014/0022328 A1* | 1/2014 | Gechter ................ G06Q 30/06 348/14.02 |
| 2014/0052496 A1 | 2/2014 | Diana et al. |
| 2014/0052606 A1 | 2/2014 | Vasudevan et al. |
| 2014/0075004 A1 | 3/2014 | Van Dusen et al. |
| 2014/0088944 A1 | 3/2014 | Natarajan et al. |
| 2014/0114822 A1 | 4/2014 | Sharma et al. |
| 2014/0119531 A1* | 5/2014 | Tuchman ............ H04M 3/5166 379/265.09 |
| 2014/0172883 A1 | 6/2014 | Clark et al. |
| 2014/0181652 A1 | 6/2014 | Stanke et al. |
| 2014/0189829 A1 | 7/2014 | McLachlan et al. |
| 2014/0195613 A1 | 7/2014 | Ogilvie |
| 2014/0201045 A1 | 7/2014 | Pai et al. |
| 2014/0222669 A1 | 8/2014 | Novak et al. |
| 2014/0244528 A1 | 8/2014 | Zhang et al. |
| 2014/0280055 A1 | 9/2014 | Chang et al. |
| 2014/0280070 A1 | 9/2014 | George et al. |
| 2014/0308648 A1 | 10/2014 | Jain |
| 2014/0316856 A1 | 10/2014 | Williams et al. |
| 2014/0324856 A1 | 10/2014 | Lahiani et al. |
| 2014/0337257 A1 | 11/2014 | Chatterjee et al. |
| 2014/0372980 A1 | 12/2014 | Verma et al. |
| 2015/0006344 A1 | 1/2015 | Saimani et al. |
| 2015/0052087 A1 | 2/2015 | Srinivasan et al. |
| 2015/0058380 A1 | 2/2015 | Polonsky et al. |
| 2015/0088608 A1 | 3/2015 | Cama et al. |
| 2015/0095267 A1 | 4/2015 | Behere et al. |
| 2015/0120718 A1 | 4/2015 | Luo et al. |
| 2015/0127587 A1 | 5/2015 | Pinckney et al. |
| 2015/0139415 A1 | 5/2015 | Skiba et al. |
| 2015/0170049 A1 | 6/2015 | Mann et al. |
| 2015/0213021 A1 | 7/2015 | He et al. |
| 2015/0229531 A1 | 8/2015 | O'Sullivan et al. |
| 2015/0242906 A1 | 8/2015 | Liu et al. |
| 2015/0254785 A1 | 9/2015 | Yang et al. |
| 2015/0317197 A1 | 11/2015 | Blair |
| 2015/0324367 A1 | 11/2015 | Aravamudan et al. |
| 2015/0324805 A1 | 11/2015 | Skiba et al. |
| 2015/0363481 A1 | 12/2015 | Haynes |
| 2015/0371137 A1 | 12/2015 | Giffels et al. |
| 2016/0048772 A1 | 2/2016 | Bruno et al. |
| 2016/0055234 A1 | 2/2016 | Visotski et al. |
| 2016/0062980 A1 | 3/2016 | Boguraev et al. |
| 2016/0078567 A1 | 3/2016 | Goldman et al. |
| 2016/0103833 A1 | 4/2016 | Sanders et al. |
| 2016/0147760 A1 | 5/2016 | N et al. |
| 2016/0148222 A1 | 5/2016 | Davar et al. |
| 2016/0148321 A1 | 5/2016 | Ciaramitaro et al. |
| 2016/0154856 A1 | 6/2016 | Olof-Ors et al. |
| 2016/0179816 A1 | 6/2016 | Glover |
| 2016/0180470 A1 | 6/2016 | Mascaro et al. |
| 2016/0189029 A1 | 6/2016 | Giffels et al. |
| 2016/0196497 A1 | 7/2016 | Allen et al. |
| 2016/0203523 A1 | 7/2016 | Spasojevic et al. |
| 2016/0217472 A1 | 7/2016 | Podgorny et al. |
| 2016/0247165 A1 | 8/2016 | Ryabchun et al. |
| 2016/0283491 A1 | 9/2016 | Lu et al. |
| 2016/0306846 A1 | 10/2016 | Adams, Jr. et al. |
| 2016/0371276 A1 | 12/2016 | Furtado et al. |
| 2017/0011352 A1 | 1/2017 | Jones-McFadden et al. |
| 2017/0024424 A1 | 1/2017 | Almohizea |
| 2017/0032251 A1 | 2/2017 | Podgorny et al. |
| 2017/0032468 A1 | 2/2017 | Wang et al. |
| 2017/0046623 A1 | 2/2017 | Murdock et al. |
| 2017/0053026 A1 | 2/2017 | Musuluri et al. |
| 2017/0124184 A1 | 5/2017 | Podgorny et al. |
| 2017/0213130 A1 | 7/2017 | Khatri et al. |
| 2017/0228459 A1 | 8/2017 | Wang et al. |
| 2017/0262529 A1 | 9/2017 | Chim et al. |
| 2017/0262900 A1 | 9/2017 | Ramachandran et al. |
| 2017/0270159 A1 | 9/2017 | Wang et al. |
| 2017/0308613 A1 | 10/2017 | Zhu et al. |
| 2017/0323233 A1 | 11/2017 | Bencke et al. |
| 2018/0032523 A1 | 2/2018 | Singhal et al. |
| 2018/0032607 A1 | 2/2018 | Singhal et al. |
| 2018/0032890 A1 | 2/2018 | Podgorny et al. |
| 2018/0089283 A1 | 3/2018 | Indyk et al. |
| 2018/0108092 A1 | 4/2018 | Goodyear et al. |
| 2018/0108093 A1 | 4/2018 | Podgorny et al. |
| 2018/0113935 A1 | 4/2018 | George et al. |
| 2018/0137203 A1 | 5/2018 | Hennekey et al. |
| 2018/0189292 A1 | 7/2018 | Grace, Jr. et al. |
| 2018/0196796 A1 | 7/2018 | Wu |
| 2018/0204106 A1 | 7/2018 | Beller et al. |
| 2018/0287968 A1 | 10/2018 | Koukoumidis et al. |
| 2018/0321951 A1 | 11/2018 | Fitzgerald et al. |
| 2019/0018692 A1 | 1/2019 | Indyk et al. |
| 2019/0018899 A1 | 1/2019 | Podgorny et al. |
| 2019/0065576 A1 | 2/2019 | Peng et al. |
| 2019/0103035 A1 | 4/2019 | Beller et al. |
| 2020/0027095 A1 | 1/2020 | Cannon et al. |

FOREIGN PATENT DOCUMENTS

| | | |
|---|---|---|
| EP | 2159715 | 3/2010 |
| JP | 2014112316 | 6/2014 |
| WO | 2001082202 A2 | 11/2001 |
| WO | WO 2011/053830 | 5/2011 |

OTHER PUBLICATIONS

The Scientific Marketer, "Uplift Modelling FAQ", article date of Sep. 27, 2007, retrieved from http://scientificmarketer.com/2007/09/uplift-modelling-faq.html (Year: 2007).

Zadeh, Z.; "Probabilistic Modeling In Community-Based Question Answering Services," Dalhousie University, Halifax, Nova Scotia; Feb. 2012.

Podgorny, et al. "Real Time Detection and Intervention of Poorly Phrased Questions," Chi EA '15, Proceedings of the 33$^{rd}$ Annual

(56) References Cited

OTHER PUBLICATIONS

ACM Conference Extended Abstracts on Human Factors in Computing Systems, Apr. 18-23, 2015, Seoul, Republic of Korea, pp. 2205-2210.

Get Satisfaction [online]. Sprinklr, 2017 [retrieved on Nov. 22, 2017]. Retrieved from the Internet: <URL: https://getsatisfaction.com/corp>.

Bartolome et al., "Processing Unstructured Voice of Customer Feedback for Improving Content Rankings in Customer Support Systems," U.S. Appl. No. 15/094,653, filed Apr. 8, 2016.

Podgorny, et al., "Content Quality and User Ranking in TurboTax AnswerXchange," Proceedings of the European Conference on Social Media, University of Brighton UK, Jul. 10-11, 2014.

Blei, David M., et al. "Latent Dirichlet Allocation;" Journal of Machine Learning Research Jan. 3, 2003, pp. 993-1022.

Steyvers, Mark, et al. "Probabilistic Author-Topic Models for Information Discovery;" KDD'04, Aug. 22-25, 2004.

Mimno, David, et al., "Sparse Stochastic Inference for Latent Dirichlet Allocation," Proceedings of the 29th International Conference on Machine Learning, Edinburgh, Scotland, UK, 2012.

Blei, David M., "Probabilistic Topic Models," Communications of the ACM, Apr. 2012, vol. 55, No. 4, pp. 77-84.

Grant, Sheryl, et al., "The Human Face of Crowdsourcing: A Citizen-led Crowdsourcing Case Study;" 2013 IEEE International Conference on Big Data, Silicon Valley, CA, 2013, pp. 21-24.

Encyclopedia Britannica, "Graphical User Interface (GUI);" Sep. 5, 2015. Retrieved from the internet <URL: https://www.britannica.com/technology/graphical-user-interface>.

Wikipedia, "Widget (GUI)," Sep. 7, 2016. Retrieved from the internet <URL: https://en.wikipedia.org/w/index.php?title=Widget_(GUI)&oldid=738206274>.

Kumar et al., "Personalized Web search Using Browsing History and Domain Knowledge" International Conference on Issues and Challenges in Intelligent Computing Techniques (ICICT), IEEE 2014, pp. 493-497.

Wen et al., "Clustering User Queries of a Search Engine," Proceedings of the 10th International Conference on World Wide Web, pp. 162-168, ACM, 2001 (Year. 2001).

Han et al., "Understanding and Supporting Cross-Device Web Search for Exploratory Tasks with Mobile Touch Interactions," Apr. 2015, ACM Transactions on Information System, vol. 33, No. 4, pp. 1-35, (Year: 2015).

Fitchett et al., "An Empirical Characterisation of File Retrieval," Oct. 3, 2014, University of Canterbury, Christchurch, New Zealand, Int. J. Human-Computer Studies 74 (2015), pp. 1-13 (Year: 2014).

* cited by examiner

| TYPE/FORMAT OF QUESTION | OCCURRENCE PERCENTAGE % | SATISFIED WITH ANSWER % |
|---|---|---|
| CLOSED-ENDED (Yes/No or Multiple choice) | 28.1 | 85.9 |
| WHO (Person) | 1.6 | 81.4 |
| WHAT (Thing or object) | 9.7 | 73.1 |
| WHERE (Position or place) | 8.6 | 70.2 |
| WHEN (Time or occasion) | 5.5 | 68.2 |
| ILL-FORMED (Search Query) | 28.7 | 66.8 |
| HOW (Way or form) | 21.6 | 66.4 |
| WHY (Reason or explanation) | 7.5 | 56.3 |

FIG. 1A

| MODEL ATTRIBUTE | WALD CHI-SQUARE |
|---|---|
| "CLOSED-ENDED" TYPE | (+) 339 |
| "WHY" TYPE | (−) 317 |
| REPORTING A PROBLEM | (−) 180 |
| "HOW" TYPE | (−) 105 |
| INTENT TO CALL/CHAT | (−) 104 |
| SUBJECT LENGTH | (+) 87 |
| SOFTWARE RELATED | (−) 77 |
| PERSONAL PRONOUN "YOU" | (−) 75 |
| INTENT TO PRINT TAX RETURN | (−) 66 |
| QUESTION MARK IN QUESTION | (+) 59 |

FIG. 1C

Ask a multiple-choice question (recommended):

Can, are, do, does, if, is, should, will...

Answer choices:
◉ Yes or No
○ Let me specify...

—or—

Ask an open-ended question:

Where, what, when, who, how...

FIG. 2A

QUESTION OPTIMIZER

Get better answers!
Can you rephrase "Why can't I print?"

BEST: Ask it as a multiple-choice question

Can, are, do, does, if, is, should, will, which...

Be concise.                    15 more characters
You can add details next       required Answer choices:
This will help you get the answer you need,
but will not prevent people from adding detailed
answers.
⊙ Yes or No
○ Let me specify GOOD: Ask it as an open-ended question Where, what, when, who, how...

Be concise.                    15 more characters
You can add details next       required Skip | Submit optimized question

FIG. 2B

METHOD AND SYSTEM FOR INCREASING USE OF MOBILE DEVICES TO PROVIDE ANSWER CONTENT IN A QUESTION AND ANSWER BASED CUSTOMER SUPPORT SYSTEM

BACKGROUND

Software applications and systems have become indispensable tools for helping consumers, i.e., users, perform a wide variety of tasks in their daily professional and personal lives. Currently, numerous types of desktop, web-based, and cloud-based software systems are available to help users perform a plethora of tasks ranging from basic computing system operations and word processing, to financial management, small business management, tax preparation, health tracking and healthcare management, as well as other personal and business endeavors, operations, and functions far too numerous to individually delineate here.

One major, if not determinative, factor in the utility, and ultimate commercial success, of a given software system of any type is the ability to implement and provide a customer support system through which a given user can obtain assistance and, in particular, get answers to questions that arise during the installation and operation of the software system. However, providing potentially millions of software system users with specialized advice and answers to their specific questions is a huge undertaking that can easily, and rapidly, become economically infeasible.

To address this problem, many providers of software systems implement or sponsor one or more question and answer based customer support systems. Typically, a question and answer based customer support system includes a hosted forum through which a user can direct their specific questions, typically in a text format, to a support community that often includes other users and/or professional support personal.

In many cases, once a user's specific question is answered by one or more members of the support community through the question and answer based customer support system, the user's specific question, and the answer to the specific question provided by the support community, is categorized and added to a customer support question and answer database associated with the question and answer based customer support system. In this way, subsequent users of the software system can access the user's specific question or topic, and find the answer to the user's question, via a search of the customer support question and answer database. As a result, a dynamic customer support question and answer database of categorized/indexed user questions and answers is made available to users of the software system through the question and answer based customer support system.

The development of customer support question and answer databases has numerous advantages including a self-help element whereby a searching user, i.e., a user accessing the resulting question and answer pair, can find an answer to their particular question by simply searching the customer support question and answer database for topics, questions, and answers related to their issue. In addition, if the answer to the user's specific question is not in the customer support question and answer database, the user can then become an asking user by submitting their question to the question and answer based customer support system, typically through the same web-site and/or user interface. Consequently, using a question and answer based customer support system including a customer support question and answer database, potentially millions of user questions can be answered in an efficient and effective manner, and with minimal duplicative effort.

Despite having the ability to digitally communicate between the far ends of the globe with lightning-fast speeds, an answer that is received too late, can be as good as no answer at all. In currently available question and answer based customer support systems, once an asking user's question is submitted, the question is placed at the end of a queue, which is typically ordered by submission data and is typically organized as a first in first out queue. With millions of users seeking for answers and submitting new questions, unanswered questions in a question and answer queue can easily and rapidly grow to hundreds, thousands, and even tens of thousands of unanswered questions. Some of the existing question and answer based customer support systems rely on hundreds, if not thousands, of volunteers to submit responses to the unanswered questions in the question and answer queue. Because volunteers, by their nature, respond to unanswered questions at their leisure or at their convenience, a large growing queue of unanswered questions may be indicative of a question and answer support system that is inadequately catering to the needs of the volunteers.

What is needed is a method and system for increasing use of mobile devices by customer support personnel in providing answer content in a question and answer based customer support system, to reduce the latency between question submission and answer submission, and to reduce the number of unanswered questions in a queue for the question and answer based customer support system.

SUMMARY

Embodiments of the present disclosure address some of the shortcomings associated with traditional question and answer based customer support systems by increasing use of mobile devices by customer support personnel in providing answer content in a question and answer based customer support system, to reduce the latency between question submission and answer submission, and to reduce the number of unanswered questions in a queue for the question and answer based customer support system. The question and answer based customer support system routes questions that are easily/conveniently answerable on a mobile device to a mobile device queue, within the question and answer based customer support system, to enable customer support personnel to receive and respond to question submissions from their mobile devices conveniently, according to one embodiment. Because many of the customer support personnel volunteers already respond to questions during leisure or available time, facilitating question responses via mobile devices can increase the quantity and decrease the response times to questions submitted to the question and answer based customer support system, according to one embodiment. If a customer submits a question to a customer support help forum, with the expectation of receiving assistance, then the customer may be unhappy with the service provider when the customer does not receive a timely (within minutes or hours) response. On the other hand, if a customer receives a helpful response to a submitted question before the customer seeks the answer elsewhere, the customer is likely to attribute his/her gratefulness towards the service provider, thus building additional goodwill for the service provider. Furthermore, users who are seeking answers can see the difference between a question submission date and a question response date, and the users may place less value on the customer support service when it is apparent that a significant lag exists between question submission and question response. Accordingly, the disclosed systems and methods for increasing use of mobile devices by customer support personal to provide answer content in a question and answer based customer support system solves a business need to provide timely responses to customers and potential customers, even though the number of questions may exceed the response capacity of the service provider's paid employees. In one embodiment, the question and answer based customer support system attempts to get a software system user's question answered while the user is still addressing a particular task or while the user is still in a software system session (e.g., while the user is working on a tax return or while a user is completing a task within a tax return preparation system).

Prior to routing any questions to the customer support personnel, the question and answer based customer support system performs an initial analysis on the question being asked. In this way, the question itself is analyzed to predict the answerability of the questions from a mobile device. In one embodiment, the answerability of a question from a mobile device is determined based on the predicted length of the answer, whether it is predicted that the answer will include one or more web links, and/or whether it is predicted that the user will need to perform research to respond to the question. One or more predictive models are trained using one or more years of existing question and answer data to determine estimates/predictions of the answer length, web link, and/or research, according to one embodiment.

In one embodiment, user historical data indicating the current user's previous interactions with the software system, and/or the question and answer based customer support system, is obtained. In one embodiment, in conjunction with the pre-question submission analysis of the attributes, subject matter, and format of the question itself, the user historical data is used to identify questions being entered into the question and answer based customer support system that are not likely to result in answer content that is suitable for being provided from a mobile device. In one embodiment, the user historical data is used to generalize the likely content of the question and/or length of an answer to the questions based on characteristics of the user, such as, but not limited to, zip code, occupation, salary range, number of dependents, number of prior electronic tax return filings, and/or satisfaction with previous answers received with the question and answer based customer support system.

In one embodiment, user profile data indicating various user attributes is obtained. In one embodiment, the user profile data includes data obtained from other software systems used by the user and the resulting user profile data is shared with, or linked to, two or more software systems. In one embodiment, in conjunction with the pre-question submission analysis of the attributes, subject matter, and format of the question itself, the user profile data is used to identify questions being entered into the question and answer based customer support system that are not likely to be answerable with a mobile device, e.g., the answer will likely include web links, will need research, etc.

In one embodiment, questions that are determined to be suitable for or answerable from a mobile device are routed to a mobile question and answer queue within a question and answer database that is within the question and answer based customer support system. The question and answer database includes both mobile answerable questions (e.g., answerable from a mobile device) and non-mobile answerable questions, according to one embodiment. The mobile question and answer queue can be implemented using one or more of a variety of techniques, according to one embodiment. In one embodiment, the mobile question and answer queue is a different table, page, or data structure than the non-mobile/standard question and answer queue, within the question and answer database. In one embodiment, the mobile answerable questions and non-mobile answerable questions are maintained in a single table, page, and/or data structure within the question and answer database, but the different types of questions are associated with mobile and/or non-mobile markers or indications within the database. In yet another embodiment, the question and answer based customer support system hosts multiple question and answer databases, with at least one of the databases being allocated/dedicated to hosting the mobile question and answer queue. When customer support personnel access or login to the question and answer based customer support system with a mobile device (e.g., a tablet, a smart phone, a personal digital assistant, etc.), the customer support personnel are provided access to the mobile question and answer queue to encourage the customer support personnel to respond to the questions that are answerable with the mobile device. Because questions that are answerable with a mobile device include questions that are predicted to have relatively shorter answers, predicted to not need web links, are predicted to not require research to answer, the customer support personnel are encouraged to respond to and answer questions within the question and answer database, during times that the customer support personnel may be limited to use of a mobile device (as opposed to having full access to a desktop or laptop computer), according to one embodiment. In one embodiment, once questions are identified as inconvenient or ill-suited for mobile device answering, using parsing and pre-question submission analysis of the attributes, subject matter, and format of the question itself, and/or the user historical data, and/or user profile data, the question is routed to the non-mobile/standard queue for answering.

Using the concepts disclosed herein, the answerability of questions from a mobile device is predicted before the question is formally submitted to the question and answer based customer support system. If the question is deemed answerable from a mobile device, the question is moved to a mobile question and answer queue within the question and answer based customer support system to increase the chance that the question will be answered sooner by customer support personnel, according to one embodiment. In one embodiment, customized format transformation/question reformation instructions are provided so that the user is coached during the user's question formulation, i.e., during the user's entry of the data representing the question. In this way there is a higher likelihood that the question will be understood and will be able to be answered from a mobile device, enabling volunteer customer response personnel to spend more parts of the day managing and/or reducing the quantity of unanswered questions in a question and answer queue.

The disclosed method and system for increasing use of mobile devices by customer support personnel in providing answer content in a question and answer based customer support system provides for significant improvements to the technical fields of customer support, information dissemination, software implementation, and user experience. In addition, using the disclosed method and system for increasing use of mobile devices by customer support personnel in providing answer content in a question and answer based customer support system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for increasing use of mobile devices by customer support personnel in providing answer content in a question and answer based customer support system disclosed herein.

BRIEF DESCRIPTION OF THE DRAWINGS

FIG. 1A shows a table of results data obtained through analysis of actual questions submitted to a question and answer based customer support system indicating question types, the frequency of the question types as a percentage of questions asked, and ranking of the question types by up vote fraction;

FIG. 1C is a table of results data obtained through analysis of actual questions submitted to a question and answer based customer support system showing the Wald Chi-square statistics for the top subject attributes of a user vote prediction model;

FIG. 2A is an illustrative example of a first question transformation interface screen used to provide users format transformation/question reformation instructions that direct users in transforming improperly formatted questions into properly formatted closed-ended questions in accordance with one embodiment;

FIG. 2B is an illustrative example of a second question transformation interface screen used to provide users format transformation/question reformation instructions and using a question optimizer approach to direct users towards transforming improperly formatted questions into properly formatted questions in accordance with one embodiment;

Figure 1B:
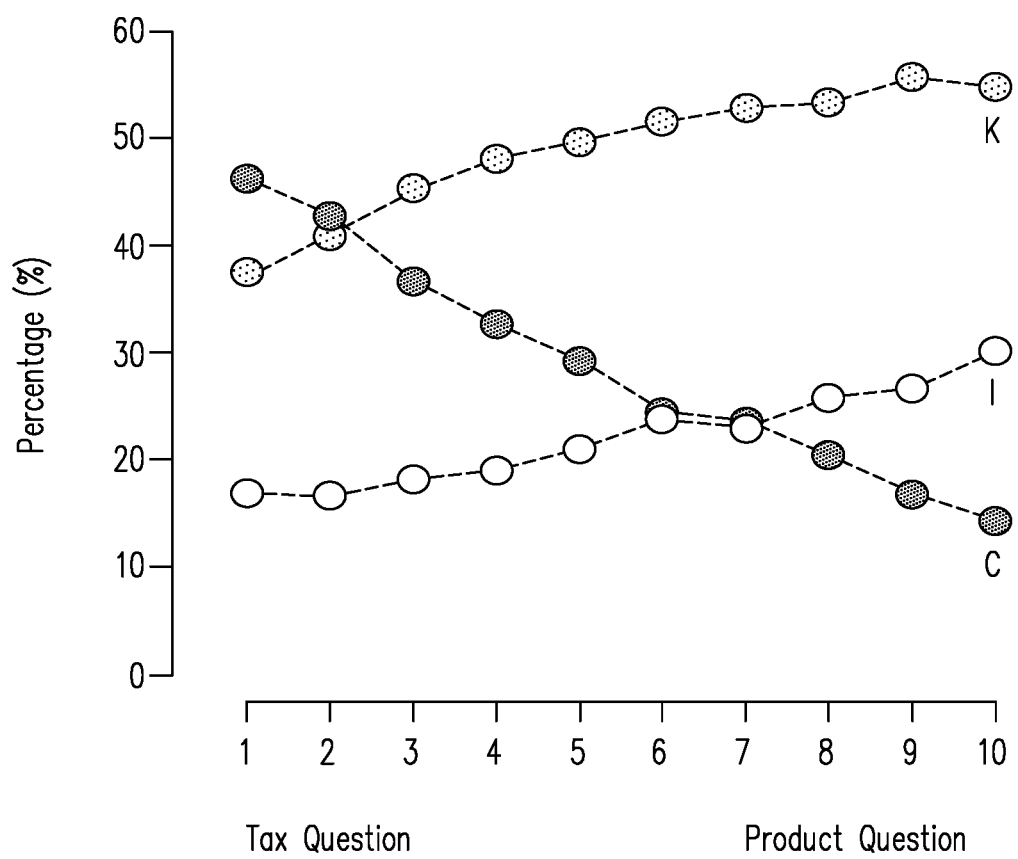
FIG. 1B is a graph of results data obtained through analysis of actual questions submitted to a question and answer based customer support system showing the discovered relationship between "subject matter questions," "product related questions," and the category of question asked.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

TERM DEFINITIONS

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "question quality indicator" includes any mechanism, means, or feature/function provided to indicate to a user a determined quality of a question being provided by the user. Specific examples of question quality indicators include, but are not limited to, meter displays; line displays; score displays; audio content; visual content; images; backgrounds; avatars; highlighting mechanisms; icons; and any other features that individually, or in combination, relay to a user a determined quality of a question being submitted.

Herein, the term "party," "user," "user consumer," and "customer" are used interchangeably to denote any party and/or entity that interfaces with, and/or to whom information is provided by, the method and system for increasing use of mobile devices by customer support personnel in providing answer content in a question and answer based customer support system described herein, and/or a person and/or entity that interfaces with, and/or to whom information is provided by, the method and system for increasing use of mobile devices by customer support personnel in providing answer content in a question and answer based customer support system described herein, and/or a legal guardian of person and/or entity that interfaces with, and/or to whom information is provided by, the method and system for increasing use of mobile devices by customer support personnel in providing answer content in a question and answer based customer support system described herein, and/or an authorized agent of any party and/or person and/or entity that interfaces with, and/or to whom information is provided by, the method and system for increasing use of mobile devices by customer support personnel in providing answer content in a question and answer based customer support system described herein. For instance, in various embodiments, a user can be, but is not limited to, a person, a commercial entity, an application, a service, and/or a computing system.

As used herein, the term "asking user" includes a user of a software system submitting a question to a question and answer based customer support system.

As used herein, the term "searching user" includes a user of a software system submitting a search query to a customer support question and answer database associated with a question and answer based customer support system.

As used herein, the term "responding user" includes a user of a software system submitting a response to a question for a question and answer based customer support system. In one embodiment, the term "response" is interchangeably used with the term "reply", and the term "responding user" is interchangeably used with the term "replying user" and/or "answering user". In one embodiment, a "responding user", "replying user", and/or "answering user" is a user who submits an answer to a question or one who submits a comment to a question in the question and answer based customer support system.

THEORY AND EMPIRICAL ANALYSIS

The embodiments disclosed herein were developed to incorporate theories and address relationships discovered through analysis of data collected from a specific question and answer based customer support system implemented by Intuit™ Inc. of Mountain View, Calif. The specific question and answer based customer support system through which the data was collected was the TurboTax™ AnswerXchange™ (AXC) question and answer based customer support system.

AXC is a social question and answer based customer support system providing support for TurboTax™ customers and also serving as a discussion forum in the area of US Federal and State taxation. AXC is also used to generate reusable content for TurboTax™ user searches, i.e., to create a customer support question and answer database for TurboTax™ users. In fact, only 1.5% of AXC users are asking users who actually submit questions, while the remaining searching users look for answers by searching a customer support question and answer database provided through AXC.

AXC includes a support community of customer support personnel. In one embodiment, questions submitted to AXC are answered by members of the support community of customer support personnel. In one embodiment, the customer support personnel include paid professional support personnel in the employ of Intuit™ and volunteer, often non-paid, expert users of the TurboTax™ software system. In one embodiment, the volunteer expert users of the TurboTax™ software system are identified and certified by Intuit™.

Questions submitted to AXC were formulated in a variety of ways and directed to various broad categories. As one example, some questions were "product related questions", e.g., questions related to pricing, installation, version choice, etc. of the TurboTax™ software system that often had little or no relation to the subject matter/endeavor supported by the TurboTax™ software system, i.e., tax preparation. On the other hand, some questions were "subject matter related," or substantive questions, directly related to the subject matter/endeavor supported by the TurboTax™ software system, i.e., Federal and State taxation and tax preparation.

As an example, the questions "What version of TurboTax™ should I use?" or "How do I install TurboTax™?" would be product related questions while the questions "Can I deduct my computer?" or "What is my adjusted gross income?" would be subject matter related questions. As discussed below, it was empirically determined that, in general, product related questions are best answered by paid support personnel in the employ of Intuit™ while subject matter related questions are often best answered by volunteer expert users.

Similar to other question and answer based customer support systems, AXC measures the quality of content, and answer content in particular, by collecting statistics of up and down votes directed to answer content provided by the asking users and searching users where an up vote indicates user satisfaction with the answer to the question and a down vote indicates user dissatisfaction with the answer to the question.

At the same time, the AXC questions were not ranked or judged based on quality of content beyond user satisfaction ratings, unless the question was determined as inappropriate and blocked from AXC. Therefore, user satisfaction with answer content in AXC typically would be derived from user votes alone thus providing a useful metric for answer quality. For example, this approach was applied to predicting answer satisfaction in AXC based on the one or more attributes of the question and answer combined with one or more AXC users' attributes. On the other hand, as disclosed herein, a recent analysis of AXC vote statistics found that answer quality/satisfaction is largely predetermined by the question subject matter, and/or type/format, and that users' satisfaction votes can be predicted with reasonable accuracy based on the attributes of the question alone. This finding provided a practical framework for "pro-active" detection of low-quality content at the question submission stage, i.e. before the question is even answered, and is the foundation of methods and systems for pro-actively improving answer content in a question and answer based customer support system.

As noted above, questions submitted to AXC were formulated in a variety of ways and directed to various broad categories and subjects and in various question formats representing various question types. As one example, one user may ask "What version of TurboTax should I use?" Another user may ask "How do I install TurboTax?" Yet another user may ask "Can I deduct my computer?" It was determined that the optimal AXC design must be based on an empiric question taxonomy taking into account one or more of, the question category, the question format, the question grammar structure, the type of anticipated answer, asker type, and various other factors.

The Inventors began with general knowledge/open-ended question taxonomy. Specifically, the Inventors looked for "Wh- words" and "How" questions including interrogative pronouns such as "Who", "What", "When", "Where", "Why" and "How" used to compose general knowledge/open-ended category questions.

FIG. 1A is a table of results data obtained through the analysis of actual questions submitted to AXC. The table of FIG. 1A shows question types, also referred to herein as formats (column 101) of the 2014 AXC questions received, the frequency of the question types as a percentage of questions asked (column 102), and ranking of the question types/formats by up vote fraction (column 103) that are shown in FIG. 1A in the descending order. It is noted that the sum of up vote and down vote fractions can be equal to greater than 100% because some questions may belong to more than one type. As seen in FIG. 1A, when "Wh- words" analysis was applied to the AXC question subjects with question summaries limited to 255 characters, 54.5% of the questions received fell into the general knowledge/open-ended category.

One of the Inventors' goals was to separate question types/formats by the observed statistics relating up and down votes associated with the answers provided to each question types/formats. The result of this analysis is shown in FIG. 1A. Referring to FIG. 1A, note that "Why" formatted questions can often indicate mildly negative sentiment and often imply a rhetorical question, e.g., "Why is this so difficult?" or "Why is this taking so much time?" The Inventors postulate that this explains the lowest up vote fraction of 56.3% being associated with the "Why" question type/format in the general knowledge/open-ended category, as shown in FIG. 1A.

Next, the Inventors selected closed-ended category questions from the 56.8% of AXC questions that did not belong to the general knowledge/open-ended category. Most of the closed-ended type/format questions in AXC were in the sub-category of "Yes/No" type/format questions. These "Yes/No" type/format questions typically start with an auxiliary verb such as "Do", "Can", "Be." As indicated by the name, the "Yes/No" type/format questions can be answered by a "Yes" or "No" answer. A specific illustrative example of a "Yes/No" question would be: "Can I deduct my computer?" with the possible answers "Yes, you can" or "No, you can't."

The second sub-category of closed-ended question type/format includes "Choice" type/format questions. "Choice" type/format questions generally start with an auxiliary verb as well, but also contain the conjunction "or." Consequently, "Choice" type/format questions usually result in a multiple choice answer embedded in the body of the question. A specific illustrative example of a "Choice" type/format question would be "Should I install X or Y version?" with the possible answers "You need to install Y," "You need to install X," "You need to install either X or Y," "You need to install neither X or Y."

As seen in FIG. 1A, closed-ended type/format questions resulted in an impressive 85.9% up vote, i.e., 85.9% of users who submitted questions in the closed-ended format were satisfied with the answer provided. As seen in FIG. 1A, this was the highest satisfaction rating of all question types/formats. The high fraction of the up votes for the answers to the closed-ended type/format questions of in FIG. 1A is not surprising. Closed-ended type/format questions were typically long enough to provide sufficient context for answering, and were more likely to be subject matter related questions, as opposed to product related questions. As discussed below, subject matter related questions were channeled to volunteer expert users for answering and had a higher predicted likelihood of resulting in an up vote (see FIG. 1B discussed below).

Finally, if a question submitted to AXC was deemed to be neither a general knowledge/open-ended nor a closed-ended type/format question, the question was classified as being in the ill-formed question category by default. Most of the ill-formed category questions did not follow a grammatically correct question format either intentionally, e.g., search query type, or unintentionally, e.g., improper grammar, punctuation, etc., and were more difficult to answer. This, of course resulted in a higher probability of down vote from the users.

"How" and "Why" question types/formats were detectable with regular expressions analysis. Similarly "When", "Where" and "who" question types/formats were detectable with regular expressions analysis but the analysis was slightly more involved as it typically required part-of-speech tagging to avoid confusion with relative adverbs and relative pronouns. However, as seen in FIG. 1A, these question types/formats were less common in AXC. More exotic question types/formats, such as "tag questions," "leading questions," and "embedded questions," were determined to be extremely rare in AXC and therefore were largely excluded from the Inventors' analysis.

FIG. 1B is a graph of results data obtained through analysis of actual questions submitted to AXC and showing the discovered relationship between: the percentage of up votes indicating user satisfaction with the answer provided (vertical axis), the category of question, e.g., "subject matter questions", or in the case of AXC, tax questions; "product related questions," or in the case of AXC TurboTax™ product questions; and the type/format of the question asked. The horizontal axis in FIG. 1B was divided into Deciles 1 to 10, with Decile 1 corresponding to well-defined subject matter related questions, and Decile 10 corresponding to well-defined product related questions. Consequently, FIG. 1B displays the satisfaction percentages of general knowledge/open-ended (K), closed-ended (C), and ill-formed questions types versus content type. In the Inventors' analysis, only voted upon, and therefore answered, questions were used to ensure the results reported/displayed in FIG. 1B that were consistent with the results reported/displayed in FIG. 1A.

FIG. 1C is a table of results data obtained through analysis of actual questions submitted to AXC showing the Wald Chi-square statistics for the top subject attributes of an AXC user vote prediction model. In FIG. 1C, the (+) and (−) signs indicate positive or negative correlation between attribute and up vote. As seen in FIG. 1C, closed-ended, "Why" and "How" question types are three out of the four most important model attributes. The third attribute, "Reporting a problem," was found to correlate with "Why" and "How" types. As noted above, "Why" questions are often rhetorical and may remain "unanswerable" unless the user provides further details.

Once the data of FIG. 1A, FIG. 1B, and FIG. 1C was obtained, an initial goal of correlating the different question types/formats with the observed statistics relating up and down votes associated with the answers provided to each question type/format was attained. Then three additional goals were identified: transforming "Why" and "How" type/format questions into to closed-ended type/format questions; transforming "unanswerable" questions into "answerable" questions; and transforming ill-formed questions into "well formed" questions.

With respect to the goal of transforming "Why" and "How" type/format questions into to closed-ended type/format questions, it was determined that the biggest positive and negative impacts on AXC user satisfaction came from the answers to closed-ended and "how/why" type/format questions, respectively. While it is difficult to alter the broad category/subject of the question, e.g., switching user attention from product related questions to subject matter related questions, it was determined that it may be possible to transform the question type/format from a low quality format question, with a low predicted user satisfaction with any answer to the question, to a high quality format question, with a higher predicted user satisfaction with any answer to the question. For example, asking the user to re-phrase/transform a "Why" type/format question into a closed-ended type/format question.

With respect to the goal of transforming "unanswerable" questions into "answerable" questions, it was determined that the unanswerable questions were often formed as a statement without specific details. The task therefore involved a re-phrasing/transformation process similar to the process for transforming "Why" and "How" type/format questions into to closed-ended type/format questions, and also asking the user for more information.

With respect to the goal of transforming ill-formed questions into "well formed" questions, it was determined that re-phrasing/transforming ill-formed questions, e.g. making the questions more detailed and adding proper punctuation, may result in better answers. See FIG. 1B.

Figure 2C:
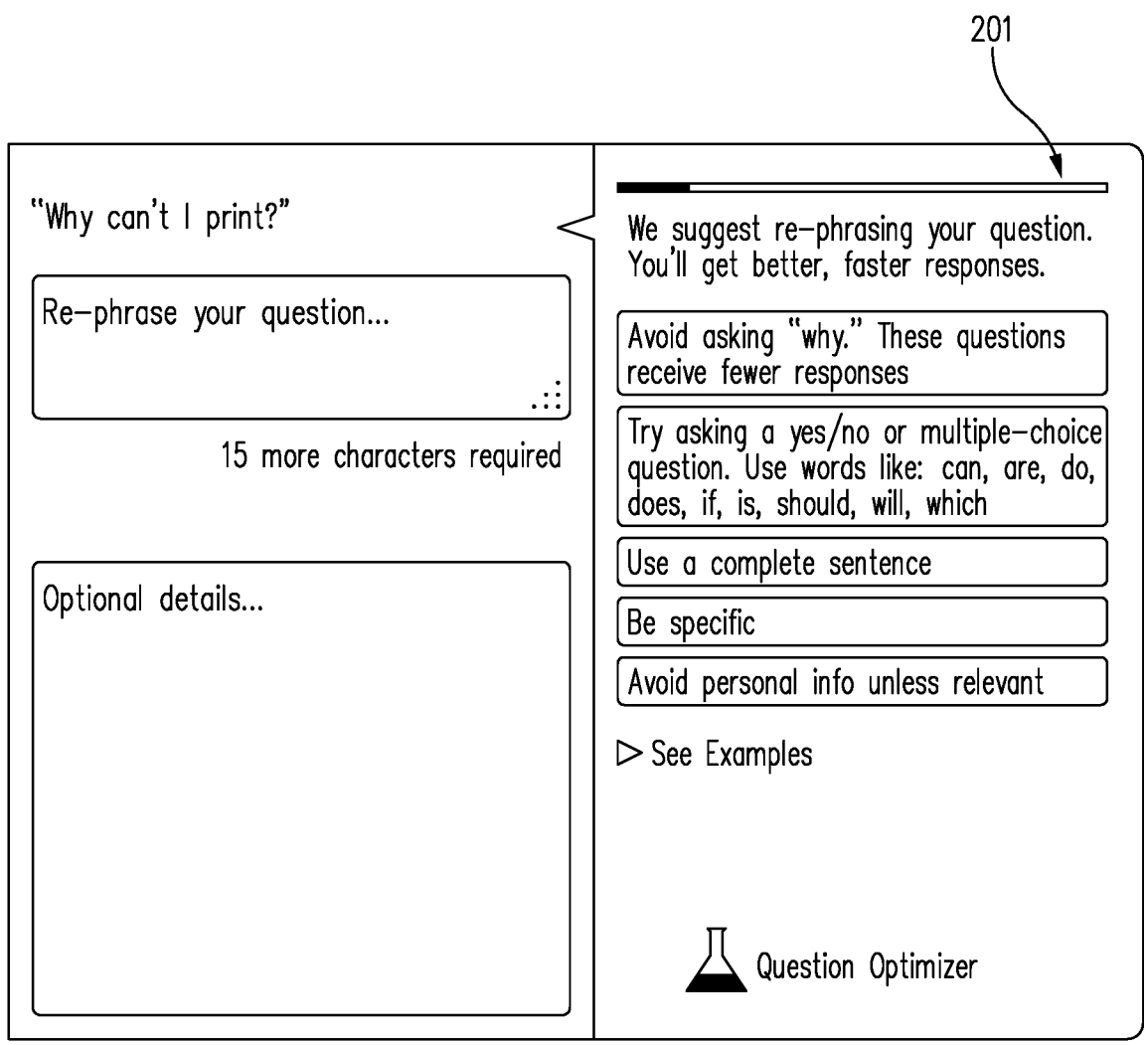
FIG. 2C is an illustrative example of a third question transformation interface screen used to provide users format transformation/question reformation instructions that direct users towards transforming improperly formatted questions into properly formatted questions and including a visual question quality indicator, which provides a simple read of question-quality in accordance with one embodiment.

To address these three goals, the Inventors designed and tested three question transformation user interface screens used to provide format transformation/question reformation instructions that direct users towards transforming improperly formatted questions into properly formatted closed-ended questions. The three question transformation user interface screens are shown in FIGS. 2A, 2B, and 2C, and are discussed separately below.

The first experience prototype, and associated question transformation interface screen, the Inventors explored is shown in FIG. 2A. The experience prototype, and associated question transformation interface screen, of FIG. 2A used constraints to direct users towards asking closed-ended questions, and went as far as defaulting to Yes/No answer types/formats. The experience prototype, and associated question transformation interface screen, of FIG. 2A emphasized closed-ended question types/formats, which yield the highest rated answers (see FIG. 1A). This approach was ultimately determined to be less than ideal because of the front-loaded cognitive overhead it created that forced users to think about their question type/format before they had a chance to even phrase it, and which ultimately proved too burdensome on the user.

It was found survey-style answer choices helped phrasing. For open-ended general knowledge/open-ended questions, the Inventors prompted with the most highly rated question-types/formats in order of effectiveness (see FIG. 1A), i.e.: "Where" type/format questions, "What" type/format questions, "When" type/format questions, "Who" type/format questions, and "How" type/format questions. The Inventors left out "Why" type/format questions since, as discussed above, "Why" type/format questions often lead to "unanswerable" or rhetorical questions.

The second experience prototype, and associated question transformation interface screen, the Inventors explored is shown in FIG. 2B and is referred to as the question optimizer approach. One example of one embodiment of the question optimizer approach is the Question Optimizer™ used by Intuit Inc. of Mountain View, Calif. The question optimizer experience prototype, and associated question transformation interface screen, of FIG. 2B allows the user to formulate/phrase a question first, then the user is provided the format transformation/question reformation instructions advising the user on how to re-phrase/transform an improperly formatted question into a properly formatted question. The question optimizer experience prototype, and associated question transformation interface screen, of FIG. 2B thus provides contextual cues to the user to help the user re-phrase the question in such a way as to achieve the highest predicted level of satisfaction with any answer to that question using the data of FIG. 1A. Using the one embodiment of the question optimizer experience prototype, and associated question transformation interface screen, of FIG. 2B, users are asked to retype their question rather than edit the question. Research confirmed that this approach helps the users re-phrase the question more effectively.

One advantage of the question optimizer experience prototype, and associated question transformation interface screen, approach of FIG. 2B is that initial question data inputs from the user can be analyzed pro-actively in real time. In most cases, the question type/format could be reliably detected from the first few characters/tokens/text of the question entered, as the question was being entered. The intervention accomplished through the question optimizer experience prototype, and associated question transformation interface screen, of FIG. 2B may therefore come at the very early stages of question formulation, alleviating the user's concern about accidentally losing the question before it is submitted to/recorded in the AXC customer support question and answer database.

To test the question optimizer experience prototype, and associated question transformation interface screen, approach of FIG. 2B, the Inventors used 40 AXC "Why" type/format questions belonging to the bottom 10% question quality. The study participants were Intuit™ employees and Peet's Coffee & Tea™ customers who were shown the "Why" formatted questions inside the question optimizer experience prototype, and associated question transformation interface screen, of FIG. 2B. Samples of the original and re-phrased questions are shown in the following Examples 1, 2 and 3.

Example 1—Transformation from "Why" type/format question to "What" type/format question:
Original Question: I don't understand why I can't efile"
Re-Phrased Question: "What steps do I need to take to efile?"
Example 2—Transformation from "Why" type/format question to closed-ended type/format question:
Original Question: "why is my debit card being declined"
Re-Phrased Question: "My Debit card has been declined. Is there something I need to do to make it work?"
Example 3:—Transformation from "Why" type/format question to "How" type/format question:
Original Question: "why does the program freeze up when I try to download a state?"
Re-Phrased Question: "When I try to download a stat the program is freezing. How can I fix it?"

The overall success rate of the question optimizer experience prototype, and associated question transformation interface screen, of FIG. 2B, i.e., the ability of the user to transform a "Why" type/format question to another, preferred, question type/format was 80%. What was especially encouraging is that some users were able to re-phrase "Why" type/format questions into closed-ended category questions (Example 2) while keeping the original intent of the question intact. This allows us to accomplish stated Goal 1, i.e., transforming "Why" and "How" type/formatted questions into to closed-ended category/formatted questions.

In addition, in most cases, the questions transformed/re-phrased using the question optimizer experience prototype, and associated question transformation interface screen, of FIG. 2B, became easier to understand and "answerable." This allows us to accomplish stated Goal 2, i.e., transforming "unanswerable" questions into "answerable" questions.

In addition, re-phrasing/transforming using the question optimizer experience prototype, and associated question transformation interface screen, of FIG. 2B, typically resulted in better formed/formatted questions compared to the original question, including proper spelling, grammar structure, capitalization and punctuation. This allows us to accomplish stated Goal 3, i.e., transforming ill-formed questions into "well formed" questions.

In another experiment, the Inventors also found that users who were asked to retype the question using the question optimizer experience prototype, and associated question transformation interface screen, of FIG. 2B, generally did a better job in re-phrasing the original question. On the contrary, users who were asked to edit the original question typically kept the original question type intact.

The third experience prototype, and associated question transformation interface screen, the Inventors explored is shown in FIG. 2C which abandons the need to choose between general knowledge/open-ended or closed-ended type/format questions upfront. This allows the user to submit/document their question, and then with that task complete, move on to optimizing/transforming it. The experience prototype, and associated question transformation interface screen, of FIG. 2C also introduces the concept of a visual question quality indicator 201, which provides a simpler read of question-quality. The Inventors believe users will be more interested in-rephrasing/transforming their question multiple times in a quest to get the meter "into the green."

The benefits of the data driven AXC question-asking experience, and the resulting method and system for pro-actively improving answer content in a question and answer based customer support system disclosed herein, are multi-fold. Better-formulated questions improve overall user experience and increase chances of receiving better answers contributing to the user satisfaction. More importantly, new questions will be both more relevant and higher quality for the 98.5% of customers who are searching users that leverage existing answers.

The data analysis discussed above provides a compelling argument for the idea that re-phrasing general knowledge/open-ended questions to closed-ended questions using the method and system for pro-actively improving answer content in a question and answer based customer support system disclosed herein, will result in higher quality question and answer based customer support system content, thus providing higher satisfaction for both the asking and searching user.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In one embodiment a software system is provided. As noted above, herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

In one embodiment a question and answer based customer support system, e.g., a social question and answer (Q&A) system, is provided to support users of the software system.

In one embodiment, the question and answer based customer support system serves as a discussion forum in an area of endeavor related to the software system. As an illustrative example, in one embodiment, the question and answer based customer support system is provided to support a tax preparation software system and therefore the discussion forum is related to "federal and state taxation and tax preparation."

In one embodiment, users of the software system are provided the capability to submit questions regarding the installation, implementation, use and operation of the software system through the question and answer based customer support system.

In one embodiment, the question and answer based customer support system includes a support community of customer support personnel. In one embodiment, the customer support personnel include paid support personnel in the employ of the provider of the software system and non-paid volunteer expert users of the software system. In one embodiment, the volunteer expert users of the software system are identified and certified by the provider of the software system.

In one embodiment, through the question and answer based customer support system, users of the software system are provided the capability to submit questions to members of the support community of customer support personnel.

In one embodiment, questions submitted to the question and answer based customer support system can be related to very different broad categories, be of various question types, and be formatted in various different ways. For example, some questions submitted to the question and answer based customer support system are product related questions, e.g., questions related to pricing, installation, version choice, etc. for the software systems that often have little or no relation to the subject matter/job of the software system, i.e., the endeavor supported by the software system. On the other hand, some questions submitted to the question and answer based customer support system are subject matter related, or substantive, questions directly related to the subject matter/endeavor of the software system.

As an illustrative example, in the case of a tax preparation software system, the questions "What version of the tax preparation software system should I use?" or "How do I install the tax preparation software system?" would be product related questions while the questions "Can I deduct my computer?" or "What is my adjusted gross income?" would be subject matter related questions.

In general, product related questions are best answered by paid support personnel in the employ of the provider of the software system while subject matter related questions are often best answered by volunteer expert users of the software system. Consequently, in one embodiment, it is desirable to identify the broad category/subject matter of the questions, e.g., product related questions and subject matter related questions, and route the questions accordingly either to support personnel or volunteer expert users of the software system.

In one embodiment, the question and answer based customer support system is used to generate reusable content for the question and answer based customer support system, e.g., the question and answer based customer support system is used to generate a customer support question and answer database. In one embodiment, the creation of the customer support question and answer database is the primary goal of the question and answer based customer support system. This is because it has been empirically demonstrated that only 1.5% of users of a typical question and answer based customer support system are asking users who submit their own questions, while the remaining 98.5% of users are searching users who look for answers by searching for similar topics and questions answered in the customer support question and answer database.

As discussed below in more detail, questions submitted to the question and answer based customer support system can also be structured/formatted in a variety of ways and these various question type/formats can vary significantly in quality, length, and effort needed to answer the question.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "yes" or "no", or via a multi-choice, or mapping.

These questions structures are used for increasing use of mobile devices by customer support personnel to provide answer content in a question and answer based customer support system, to reduce the latency between question submission and answer submission, and to reduce the number of unanswered questions in a queue for the question and answer based customer support system. By analyzing the content of each question and predicting the complexity of the response, questions can be prioritized, routed, and/or made available to mobile devices of customer support personnel (e.g., volunteers) to enable the volunteers to continue providing response generation services from their cars, while waiting in lines, while waiting for transportation, while eating, while commuting, and/or any other time a person may use a mobile device to fill time or as entertainment, according to one embodiment.

As noted above, questions submitted to the question and answer based customer support system can be formulated in a variety of ways, and directed to various broad categories/subjects, such as "product related questions" and "subject matter related," or substantive questions, directly related to the subject matter/endeavor supported by the software system. As also noted above, questions submitted to the question and answer based customer support system can be submitted in a variety question types/formats. Consequently, in one embodiment, the method and system for increasing use of mobile devices by customer support personnel in providing answer content in a question and answer based customer support system is based on an empiric question taxonomy taking into account one or more of, the question type/format, the question grammar structure, the type of anticipated answer, the asking user type/profile, and various other factors.

Questions are designated as mobile device answerable questions for routing to a mobile question and answer queue, if the questions are likely to have a concise answer and are have categories/subjects that exceed a threshold level of substantive content, according to one embodiment. For example, a question is likely to have a concise answer if the answer is predicted to be less than, for example, 160 characters, is unlikely to include a web link, and is unlikely to require customer support personnel to perform research to answer the question. In addition to being likely to have a concise answer, a question that is designated as a mobile device answerable question is one that is at least 50 percent substantive in content, according to one embodiment. In other embodiments, the question that is designated as a mobile device answerable question is one that has at least 25 percent, 35 percent, 45 percent, or some other percent of substantive content (as opposed to product-related content).

In one embodiment, closed-ended category questions are identified/defined. Most closed-ended formatted questions are placed in the sub-category of "Yes/No" type questions. These "Yes/No" type questions typically start with an auxiliary verb such as "Do", "Can", "Be." As indicated by the name, the "Yes/No" type questions can be answered by a "Yes" or "No" answer. A specific illustrative example of a "Yes/No" question would be: "Can I deduct my computer?" with the possible answers "Yes, you can" or "No, you can't."

The second sub-category of closed-ended question format includes "Choice" type questions. "Choice" type questions generally start with an auxiliary verb as well, but also contain the conjunction "or." Consequently, "Choice" type questions usually result in a multiple choice answer embedded in the body of the question. A specific illustrative example of a "Choice" type question would be "Should I install X or Y version?" with the possible answers "You need to install Y," "You need to install X," "You need to install either X or Y," "You need to install neither X or Y."

As seen in FIG. 1A, closed-ended questions result in an impressive 85.9% up vote, i.e., 85.9% of users who submit questions in the closed-ended format are satisfied with the answer provided. As also seen in FIG. 1A this is the highest satisfaction rating of all question formats. Furthermore, closed-ended questions that are "Yes/No" type questions and/or "Choice" type questions are extraordinarily easy for customer support personnel to respond to. When customer support personnel received/review "Yes/No" type questions and/or "Choice" type questions, if the customer support personnel know the answer, they can respond from their mobile devices in a matter of minutes, if not seconds. Thus, routing close-ended questions that are "Yes/No" type questions and/or "Choice" type questions to the front of a question and answer queue or routing these questions ahead of more complex questions enables the question and answer based customer support system to leverage the available time and the mobile resources of voluntary customer support personnel in reducing/managing the size of a question and answer queue, according to one embodiment.

In one embodiment, if a question submitted to the question and answer based customer support system is deemed to be neither a general knowledge/open-ended nor a closed-ended format question, the question is classified as being in the ill-formed question category by default. Most of the ill-formed category questions do not follow a grammatically correct question format either intentionally, as in the case of a search query type, or unintentionally, e.g., wrong grammar, punctuation, etc. In one embodiment, the ill-formed questions (e.g., rhetorical questions and statements) that are accepted into the question and answer based customer support system are not prioritized or identified as mobile device answerable questions and are instead routed using standard question submission procedures.

"How" and "Why" question formats are detectable with format analysis instructions that implement regular expressions analysis. Similarly "When", "Where" and "Who" question formats are detectable with format analysis instructions that implement regular expressions analysis, however, the analysis is slightly more involved as it typically requires part-of-speech tagging to avoid confusion with relative adverbs and relative pronouns. As seen in FIG. 1A these question types are less common in question and answer based customer support systems. More exotic question types such as "tag questions," "leading questions," and "embedded questions" are extremely rare in question and answer based customer support systems, and therefore are largely excluded from analysis.

In one embodiment, the question and answer based customer support system provides instructions and encouragement to the user to transform "Why" questions into another format of question to improve the general answerability of the question. In one embodiment, one or more predictive models are trained for the question and answer based customer support system by analyzing historical customer support data from one or more previous tax years to characterize a length of answers to questions having "Why", "When", "Where" and "Who" question formats. Based on the training of the one or more predictive models, the one or more predictive models generates a predicted/estimated length of answers to questions having these formats, according to one embodiment. If the application of the one or more predictive models indicates that the predicted/estimated length of the answers are less than a predetermined threshold of characters, e.g., less than 160 characters, then the question may be considered for designation as a mobile device answerable question so long as one or more other criteria are also satisfied, according to one embodiment. A typical text message is approximately 160 characters, so it is the Inventors' reasoning that having an answer that is predicted/estimated to be 160 characters or less will presumably not inconvenience customer support personnel to an extent that the customer support personnel will fail to respond to a question.

In one embodiment, user historical data indicating the user's previous interaction with the software system and/or question and answer based customer support system is obtained and used to train one or more predictive models on the answerability of questions submitted by the user and to train the one or more predictive models on the likelihood that answers to questions will be above or below a predetermined threshold, e.g., 160 characters. In one embodiment, the user historical data is used to train the one or more predictive models to determine the likelihood that answers to questions will include a web link and/or will include research on behalf of a responding user to respond to the question.

In one embodiment, user profile data indicating various user attributes is obtained. In one embodiment, the user profile data includes data obtained from other software systems used by the user and the resulting user profile data is shared with, or linked to, two or more software systems. In one embodiment, the user profile data is used to train one or more predictive models on the answerability of questions submitted by the user and to train the one or more predictive models on the likelihood that answers to questions will be above or below a predetermined threshold, e.g., 160 characters. In one embodiment, the user profile data is used to train the one or more predictive models to determine the likelihood that answers to questions will include a web link and/or will include research on behalf of a responding user to respond to the question.

As a specific illustrative example, in one embodiment, user historical data is obtained from the provided software system and/or associated question and answer based customer support system. In contrast, user profile data can be obtained from the provided software system and/or associated question and answer based customer support system, such as, for example, a tax preparation software system used by the user, and/or another software system and/or associated question and answer based customer support system, such as, for example, a personal financial management system used by the same user.

In one embodiment, questions submitted to the question and answer based customer support system by asking users, i.e., users submitting new questions, are meant to be answered by members of the support community of customer support personnel.

In various embodiments, the users of the software system enter question data through a question submission user interface provided through the question and answer based customer support system in the form of text data, audio data, symbolic data, and/or any other means, mechanism, process, or system, for entering question data as discussed herein, and/or as known in the art at the time of filing, and/or as developed after the time of filing.

As noted above, questions submitted to the question and answer based customer support system can be formulated in a variety of ways, directed to various broad categories/subjects, and in be submitted in various question formats representing various question types.

In one embodiment, as the question data is being entered by a user, and/or is otherwise received, the question data is parsed and analyzed before providing the question data to any of the one or more support personnel. As noted above, in one embodiment, questions submitted to the question and answer based customer support system by asking users are meant to be answered by members of the support community of customer support personnel. However, using the methods and systems disclosed herein, the question data is parsed and analyzed before providing the question data to any of the one or more support personnel to determine if the question data represents a mobile device answerable question, prior to routing the question to a mobile question and answer queue or to a standard question and answer queue.

In one embodiment, as the question data is being entered and/or submitted, the question data is parsed and analyzed using the format analysis instructions required to identify the question formats generated and stored as described above.

In one embodiment, general knowledge/open-ended category questions submitted are identified. As noted above, general knowledge/open-ended category questions are of the form "Who," "What," "Where," "When," "How," and "Why" formatted questions. Consequently, in one embodiment, the question data is analyzed to detect these terms, or their functional equivalents, to predict the lengths of responses to these questions to determine whether to route the questions to the mobile question and answer queue.

In one embodiment, "How" and "Why" question formats are detectable using format analysis instructions that implement regular expressions analysis. Similarly "When", "Where" and "Who" question types are detectable using format analysis instructions that implement regular expressions analysis, however, the analysis is slightly more involved as it typically requires part-of-speech tagging to avoid confusion with relative adverbs and relative pronouns.

In one embodiment, closed-ended category questions submitted are identified. In general, closed-ended question formats are detectable using format analysis instructions that implement regular expressions analysis. Closed-ended category questions are analyzed to determine whether they are product related questions or subject matter questions. The closed-ended questions are routed to the mobile question and answer queue if the questions are at least partially, e.g., at least 50%, subject matter questions, in one embodiment.

As noted above, most closed-ended category format questions are in the sub-category of "Yes/No" type questions. These "Yes/No" type questions are identified by the fact that they typically start with an auxiliary verb such as "Do", "Can", "Be." As also noted above, the second sub-category of closed-ended question format includes "Choice" type questions. These "Choice" type questions are identified by the fact that they generally start with an auxiliary verb and also contain the conjunction "or."

In various embodiments, the one or more corrective actions are taken with improperly formatted questions, including, but not limited to, filtering out the improperly formatted questions before the improperly formatted questions are forwarded/provided to the support community, and before any resources are devoted to answering the improperly formatted questions. In various embodiments, the one or more corrective actions taken include, but are not limited to, avoiding the improperly formatted questions completely by refusing to accept submission of the improperly formatted questions. In various embodiments, the one or more corrective actions taken include, but are not limited to, attempting to correct the improperly formatted questions by providing the user with a set of format transformation/question reformation instructions, in one embodiment, customized to the user based on the user historical data and/or user profile data. In one embodiment, the set of format transformation/question reformation instructions are used to transform an improperly formatted question into a properly formatted question.

In one embodiment, the user is provided the format transformation/question reformation instructions representing suggestions on how to re-phrase/reform the improperly formatted question that are customized to the specific question data being submitted, and/or customized to the user based on the user historical data and/or user profile data, in relative real-time. As a result, improperly formatted questions can transformed into properly formatted questions that enable the responding users to understand the questions, and to potentially qualify a question for expedited or prioritized routing to the mobile question and answer queue.

Using the concepts disclosed herein, the answerability of questions from a mobile device is predicted before the question is formally submitted to the question and answer based customer support system. If the question is deemed answerable from a mobile device, the question is moved to a mobile question and answer queue within the question and answer based customer support system to increase the chance that the question will be answered sooner by customer support personnel, according to one embodiment.

The disclosed method and system for increasing use of mobile devices by customer support personnel in providing answer content in a question and answer based customer support system provides for significant improvements to the technical fields of customer support, information dissemination, software implementation, and user experience. In addition, using the disclosed method and system for increasing use of mobile devices by customer support personnel in providing answer content in a question and answer based customer support system results in more efficient use of human and non-human resources, fewer processor cycles being utilized, reduced memory utilization, and less communications bandwidth being utilized to relay data to and from backend systems. As a result, computing systems are transformed into faster, more efficient, and more effective computing systems by implementing the method and system for increasing use of mobile devices by customer support personnel in providing answer content in a question and answer based customer support system disclosed herein.

Figure 3A:
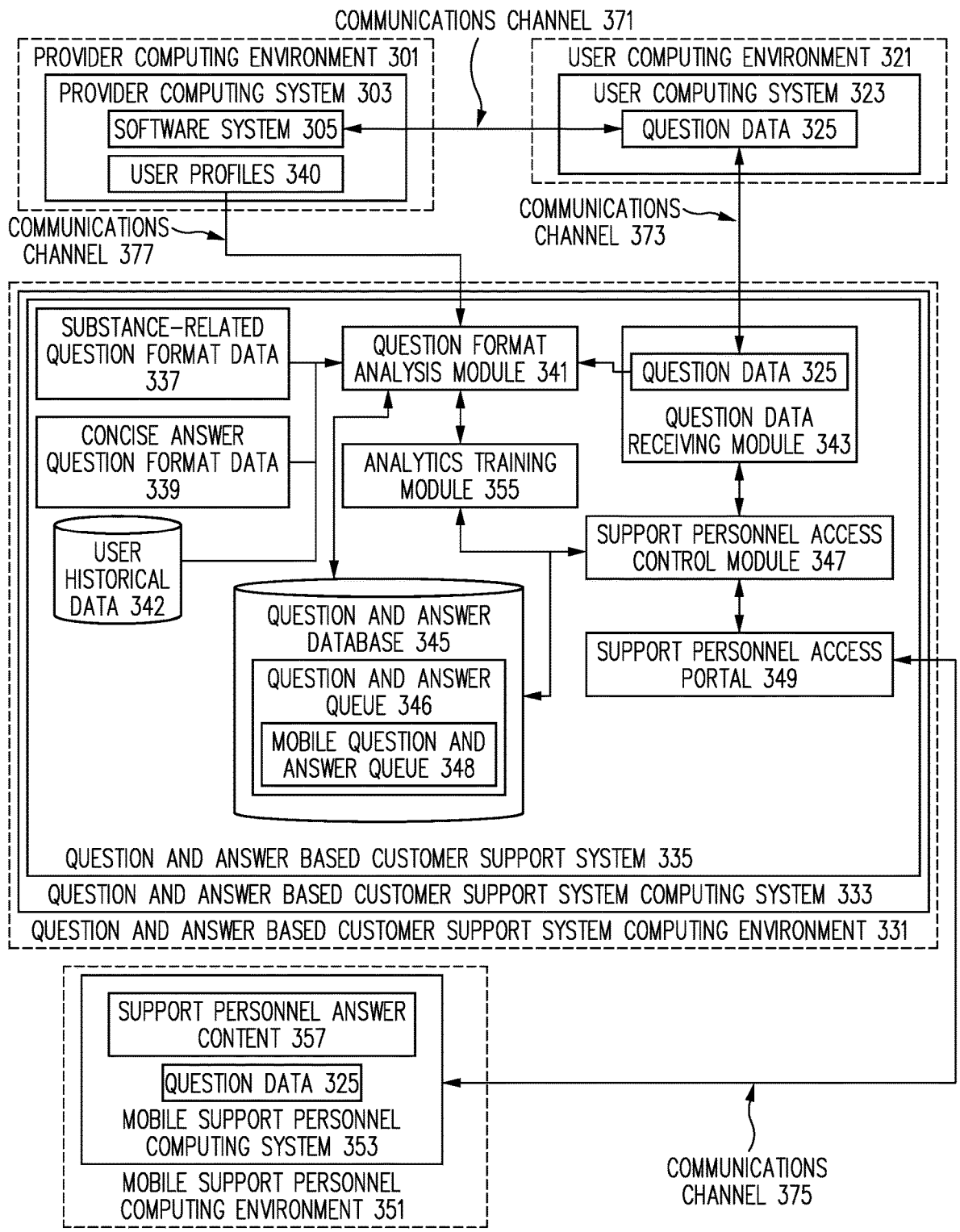
FIGS. 3A and 3B are block diagrams of a hardware and production environment system 300 for providing a process for increasing the use of mobile devices by customer support personnel to respond to questions in a question and answer based customer support system in accordance with one embodiment.

FIG. 3 is a block diagram of a hardware and production environment system 300 for providing a process for increasing the use of mobile devices by customer support personnel to provide responses to unanswered questions in a question and answer customer support system, by routing mobile device answerable questions to a mobile question and answer queue, in accordance with one embodiment.

As seen in FIG. 3, in one embodiment, a provider computing system 303 is provided in provider computing environment 301 and includes software system 305. In various embodiments, software system 305 is any software system discussed herein, known at the time of filing, and/or as developed after the time of filing.

As also seen in FIG. 3, user computing system 323 is provided in user computing environment 321. In one embodiment, a user of software system 305 accesses provider computing system 303 and software system 305 via communications channel 371.

In one embodiment, the users of software system 305 are also provided a question and answer based customer support system 335 shown as implemented on question and answer based customer support system computing system 333 in question and answer based customer support system computing environment 331.

In one embodiment, through question and answer based customer support system 335, users can submit question data 325 via communications channel 373. In one embodiment, question data 325 entered by the users represents questions to potentially be provided to one or more support personnel associated with question and answer based customer support system 335. In one embodiment, question data 325 is submitted by the users so that the questions represented by question data 325 can potentially be answered by at least one of the one or more support personnel associated with mobile support personnel computing system 353 shown as implemented in mobile support personnel computing environment 351.

In one embodiment, when question data 325 representing a question submitted by a user through question and answer based customer support system 335 is being entered by a user, and/or is otherwise received by question and answer based customer support system 335 at question data receiving module 343 communications channel 373, question data 325 is parsed and analyzed by question format analysis module 341 before providing question data 325 to any of the one or more support personnel at mobile support personnel computing system 353 to answer to the question represented by question data 325. A question format analysis module 341 receives various inputs to analyze the question data 325, according to one embodiment. The question format analysis module 341 receives substance-related question format data 337, concise answer question format data 339, user profiles 340, and user historical data 342, to determine whether the question data 325 includes a mobile device answerable question, according to one embodiment. In one embodiment, substance-related question format data 337 includes words, phrases, and/or other content that is indicative of a tax-related question or other subject matter question associated with the software system 305. In one embodiment, the concise answer question format data 339 includes word, phrases, and/or content that corresponds to a question that is predicted to have an answer that is less than a predetermined number of characters, e.g., less than 160 characters. For example, the concise answer question format data 339 includes verbs and sentence formats that are indicative of closed-ended "Yes/No" questions and "Choice" questions, according to one embodiment. The user profiles 340 includes information about the user that is collected from the user and/or about the user while the user interacts with a software system 305, and are communicated to the question format analysis module 341 through a communications channel 377, according to one embodiment. The user profiles 340 can include, but is not limited to, browsing behaviors, clickstream data, age, income, zip code, experience level with electronic tax return preparation systems, occupation, and the like, according one embodiment. The user historical data 342, as described above, includes interaction history of the user with the question and answer based customer support system 335, according to one embodiment. The user historical data 342 includes, but is not limited to, previous questions submitted, feedback provided for searched answers, search history, contributions to the customer support unity, and the like, according to one embodiment. The question format analysis module 341 is configured to apply one or more predictive models or analytics models to the question data 325, at least partially based on one or more of the other inputs, to determine whether the category of the question, the predicted length of the answer to the question, and the predicted effort of responding to the question are conditions that are satisfied prior to identifying and routing a question as a mobile device answerable question, according to one embodiment.

The question and answer based customer support system 335 includes a question and answer database 345, configured to store, manage, and provide a question and answer queue 346 and a mobile question and answer queue 348, according to one embodiment. The mobile question and answer queue 348 receives, maintains, and provides mobile device answerable questions, as determined by the question and answer based customer support system 335, according to one embodiment. In one embodiment, the question and answer queue 346 receives/maintains all questions and answers associated with the question and answer based customer support system 335, but distinguishes between non-mobile device answerable questions and mobile device answerable questions by identifying the different types of questions differently within the question and answer database 345. In an alternative embodiment, the question and answer queue 346 is a separate page, table, or data structure from the page, table, or data structure used for the mobile question and answer queue 348, according to one embodiment. In yet another embodiment, the question and answer queue 346 and the mobile question and answer queue 348 are hosted in one or more separate databases.

The questions that are routed to the mobile question and answer queue 348 are identified differently, ordered differently, queued differently, displayed differently, and/or otherwise distinguished from standard/non-mobile questions, to facilitate recognition, access and response by the responding users who use the mobile support personnel computing system 353. Most people who have a mobile device, such as a mobile phone, a tablet computing device, and/or a personal digital assistant, carry the mobile device with them throughout the day and use one or more mobile applications to fill idle time while waiting for one or more life events to occur. By prioritizing, distinguishing, or otherwise emphasizing easily/conveniently answerable questions for mobile device users, the question and answer based customer support system 335 is configured to attract the attention and services of the volunteer customer support personnel who respond to unanswered questions hosted by the question and answer database 345. Additional potential embodiments disclosing how the mobile device answer questions may be routed/prioritized differently than standard questions are discussed below in association with FIG. 3B, according to one embodiment.

Figure 3B:
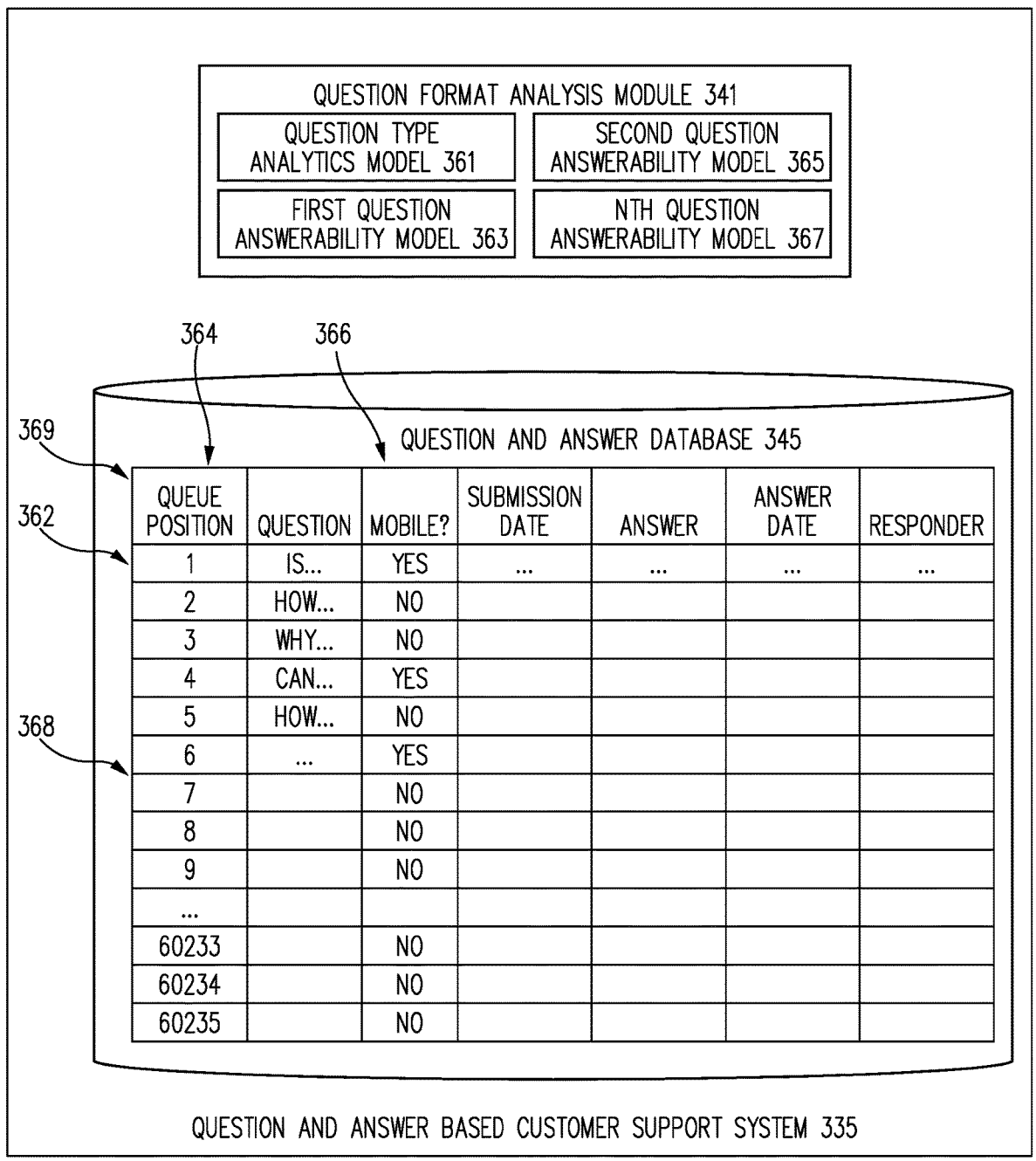

The question and answer based customer support system 335 is configured to use an analytics training module 355 to train one or more predictive models in the question format analysis module 341, according to one embodiment. The analytics training module 355 uses the user profiles 340, user historical data 342, content of the question and answer database 345, and other information to train the question format analysis module 341, according to one embodiment. The analytics training module 355 is configured to, in relative real time, continue to train/optimize the question format analysis module 341 using information that is gathered from the mobile support personnel computing systems 353, according to one embodiment. For example, when a responding user reads, analyzes, responds to, and/or rejects a question associated with the question data 325, the responding user's information is stored as support personnel answer content 357, according to one embodiment. The analytics training module 355 receives the support personnel answer content 357 through the support personnel access portal 349 and/or through the support personnel access control module 347, and uses the support personnel answer content 357 to train the question format analysis module 341, according to one embodiment. The analytics training module 355 can be configured to daily, weekly, monthly, quarterly, or otherwise periodically train the question format analysis module 341 based on the support personnel answer content 357, according to one embodiment. 013[9] FIG. 3B is a more detailed embodiment of the question format analysis module 341 and the question and answer database 345 in the question and answer based customer support system 335, according to one embodiment. 014[0] The question format analysis module 341 includes a question type analytics model 361, a first question answerability model 363, a second question answerability model 365, and an Nth question answerability model 367, according to one embodiment. The question type analytics model 361 is trained to parse and identify the category, attributes, subject matter, and format, of the question of the question data 325, according to one embodiment. Accordingly, the question type analytics model 361 can include regular expressions and/or logical expressions to identify whether the question is more product related or subject matter related, to determine whether the question is open-ended or close-ended, and/or whether the question is grammatically deficient, according to one embodiment. 0141[ ] The question answerability models 363, 365, and 367, represent one or more analytics models or predictive models used by the question format analysis module 341 for parsing and determining whether questions are suitable for routing to the mobile question and answer queue 348, according to one embodiment. Each of the question answerability models 363, 365, and 367 are trained using different techniques, different data, and/or for different purposes, according to one embodiment. For example, the first question answerability model 363 is trained using existing content of the question and answer database 345 to predict whether the length of answers of questions will include web links, will include research on the part of the responding user, and will include less than 160 characters (or some other predetermined threshold of characters), according to one embodiment. In other words, the first question answerability model 363 is trained using existing content of the question and answer database 345 to predict whether a question is suitable for routing to the mobile question and answer queue 348, according to one embodiment. The second question answerability model 365 is trained using the support personnel answer content 357 and/or other feedback received from customer support personnel who review, answer, and/or dismiss unanswered questions hosted by the question and answer database 345, according to one embodiment. By training the second question answerability model 365 with the support personnel answer content 357, the second question answerability model 365 can include real time or relative real time feedback and corrections that are based on whether mobile device answerable questions have been properly categorized as answerable from a mobile device, according to one embodiment. The Nth question answerability model 367 is trained using one or more of a combination of techniques used to train the other models 361, 363, and 365, according to one embodiment. Alternatively, the Nth question answerability model 367 can be trained/programmed to employ one or more other mathematical, statistical, and/or logical analytics techniques, according to one embodiment.

Figure 4:
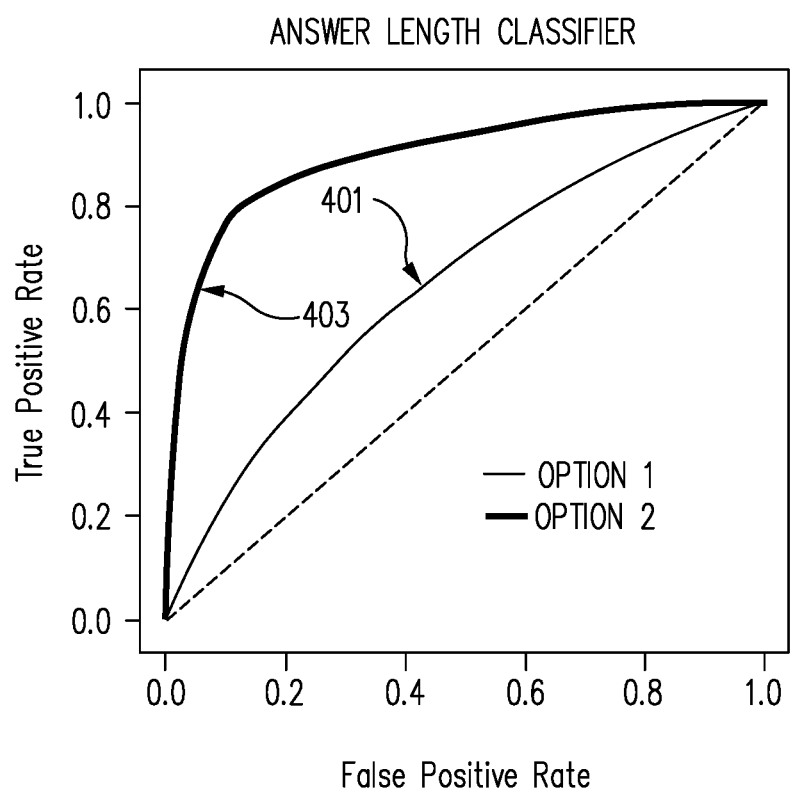
FIG. 4 is an illustrative graph of potential performance from one or more predictive models utilizing some of the disclosed techniques in accordance with one embodiment.

Directing attention, briefly, to FIG. 4, FIG. 4 includes a graph 400 that indicates an effectiveness of one or more of the question answerability models 363, 365, and 367, according to one embodiment. In one embodiment, the answerability of a question is determined based on the length of the question being less than a predetermined number of characters, e.g., less than 160 characters. In another embodiment, the answerability of the question is determined based on the attributes, format, and/or subject matter of the question. The Y axis represents a true positive rate in which a predictive model correctly determined that a question was answerable. The X axis represents a false positive rate in which a predictive model incorrectly determined that a question was answerable. The plot 401 illustrates an example of a characteristic of the predictive model that is only trained with existing question and answer data from one or more previous years, according to one embodiment. The plot 403 illustrates an example of estimated characteristics of the predictive model that is at least partially trained with feedback acquired from customer support personnel who review, evaluate, answer, and/or dismiss one or more questions, e.g., from a mobile device application, according to one embodiment. As shown, by implementing feedback acquired from customer support personnel, the true positive rate (e.g., the effectiveness) of the predictive model can be improved from approximately a 20 percent true positive rate for a 10 percent false positive rate, to approximately an 80 percent true positive rate for a 10 percent false positive rate, according to one embodiment. In other words, by training predictive models with feedback acquired from customer support personnel who respond to questions, it is estimated that the predictive models can be made to be four times more accurate, in one embodiment.

Returning to FIG. 3B, the question and answer database 345 is illustrated with a table 369, to represent the question and answer queue 346 and the mobile question and answer queue 348, according to one embodiment. The table 369 includes a number of rows 362 and a number of columns 364, according to one embodiment. Each row 362 represents an entry of an unanswered question into the table 369, and each of the columns 364 represent an attribute of each of the entries in the table 369, according to one embodiment. Example columns/attributes include, but are not limited to, queue position, question, mobile, submission date, answer, answer date, responder/replier, according one embodiment. It is to be understood that the articulated columns are but representative of significantly more columns that would be included in an actual page/table in the question and answer database 345. The column 366 represents an indication of whether a question has been designated as answerable from a mobile device, as described herein, according to one embodiment. As illustrated, some of the questions are not designated as suitable for response from a mobile device, and other questions are designated as suitable for response from a mobile device. In one embodiment, when a responding user accesses the question and answer database 345, the responding user is presented with a sorted/filtered version of the table 369 so that only the questions having an affirmative mobile indication attribute are presented to the user. In another embodiment, when a responding user accesses the question and answer database 345, the responding user is presented with a sorted version of the table 369 so that the questions having an affirmative mobile indication attribute are presented first and are followed by questions having a negative mobile indication attribute. In one embodiment, when the question and answer based customer support system 335 adds a new mobile device answerable question to the table 369, the new mobile device answerable question is inserted into the table immediately after the last mobile device answerable question. For example, a new mobile device answerable question would be inserted into table location 368 (e.g., queue position 7), to displace the question that was in the table location 368 and that had a negative mobile indication attribute, according to one embodiment. In one embodiment, the table 369 (e.g., the queue) is operated with first in first out priority scheduling for mobile device answerable questions. In another embodiment, the table 369 is operated with first in last out priority scheduling for mobile device answerable questions. In one embodiment, one or more responding users are notified of new mobile device answerable questions that are within a particular field of expertise for those responding users, to expedite and encourage the responding users to respond to unanswered questions within the question and answer database 345.

Process

Figure 5:
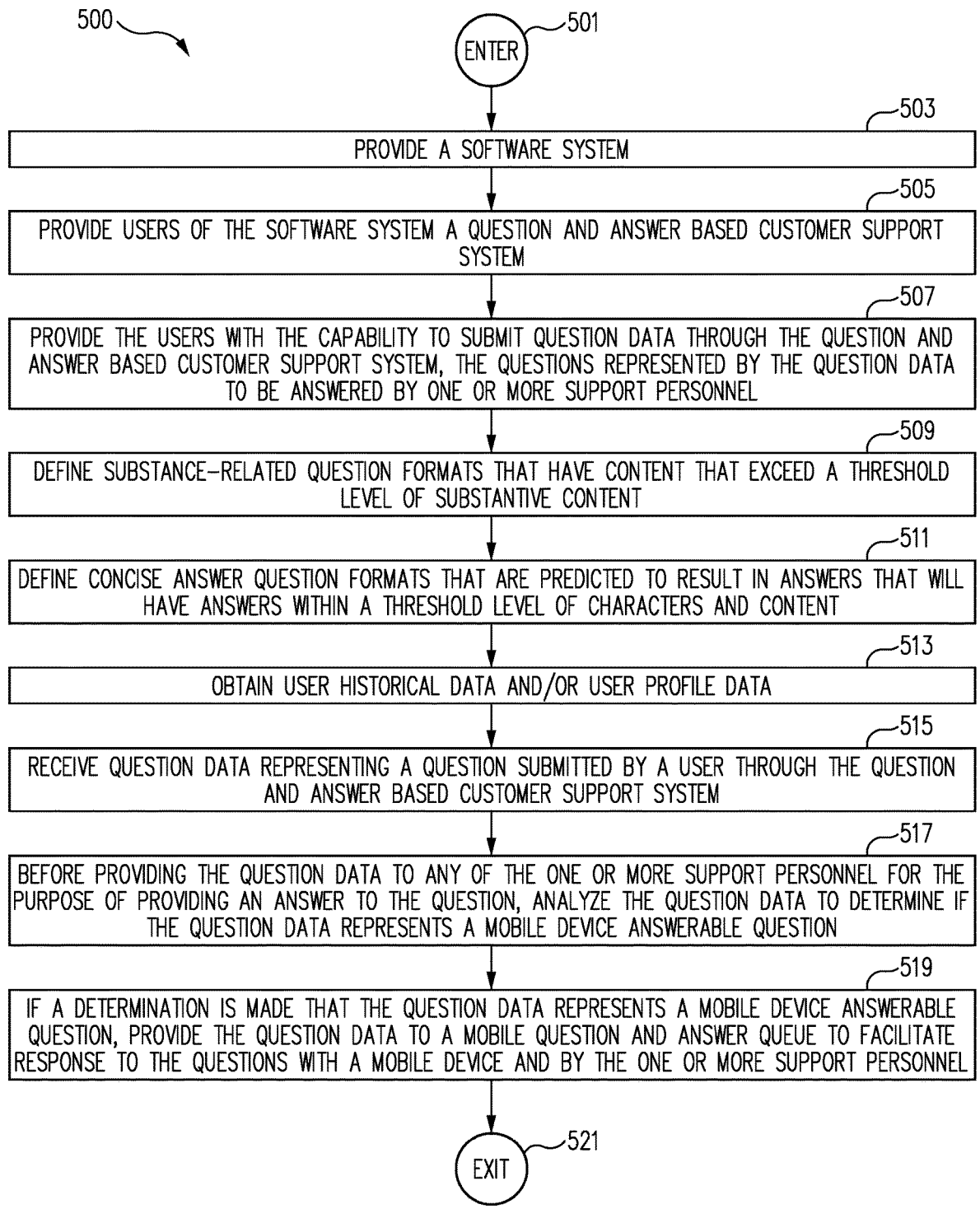
FIG. 5 is a flow chart representing one example of a generalized process for providing a process for increasing the use of mobile devices by customer support personnel to respond to questions in a question and answer based customer support system in accordance with one embodiment.

FIG. 5 is a flow chart representing one example of a process 500 for increasing the use of mobile devices by customer support personnel to respond to unanswered questions in a question and answer based customer support system, in accordance with one embodiment. In one study, the Inventors determined that approximately 38% of responses submitted by volunteers were less than 160 characters, which is the same character limitation of many text messaging devices. Therefore, identifying mobile-friendly questions (e.g., mobile device answerable questions) in real time, and routing these questions to a mobile question and answer queue (e.g., a separate queue) is one technique disclosed herein for increasing the number of mobile device answerable questions that are reviewed and answered by responding users, e.g., customer support personnel, according to one embodiment.

At operation 501, the process begins.

The operation 501 proceeds to operation 503, according to one embodiment.

At operation 503, the process provides a software system, according to one embodiment. The software system includes, but is not limited to, a tax return preparation system, a personal financial management system, and one or more of the other software systems disclosed herein, according to one embodiment.

The operation 503 proceeds to operation 505, according to one embodiment.

At operation 505, the process provides users of the software system with a question and answer based customer support system, according to one embodiment. The operation 505 serves as a discussion forum in an area of endeavor related to the software system of operation 503, according to one embodiment. The operation 505 supports a tax return preparation software system and therefore the discussion forum is related to "federal and state taxation and tax preparation," according to one embodiment.

The operation 505 proceeds to operation 507, according to one embodiment.

At operation 507, the process provides the users with the capability to submit question data through the question and answer based customer support system, the questions represented by the question data to be answered by one or more support personnel, according to one embodiment. At operation 507, the users of the software system of operation 503 are provided the capability to submit questions regarding installation, implementation, use, and operation of the software system, in addition to substantive questions related to, for example, tax law, according to one embodiment. In one embodiment, the one or more support personnel include paid support personnel in the employ of the provider of the software system and non-paid volunteer expert users of the software system. In one embodiment, the volunteer expert users of the software system are identified and certified by the provider of the software system in one or more subject matter areas of expertise. In one embodiment, questions submitted to the question and answer based customer support system can be related to very different product categories, be of various question types, and be formatted in various different ways. For example, some questions submitted to the question and answer based customer support system are product related questions, e.g., questions related to pricing, installation, version choice, etc. for the software systems that often have little or no relation to subject matter/job of the software system. On the other hand, some questions submitted to the question and answer based customer support system are subject matter related, or substantive, questions that are clearly related to the subject matter/content of the software system. In general, product related questions are best answered by paid support personnel in the employ of the provider of the software system, while subject matter related questions are often best answered by volunteer expert users of the software system. Consequently, in one embodiment, it is desirable to identify the broad category of questions, e.g., product related questions and subject matter related questions, and route subject matter related questions to the mobile question and answer queue if the questions satisfy other criteria for being mobile device answerable questions.

As a specific illustrative example, questions submitted to the question and answer based customer support system can be, but are not limited to: general knowledge/open-ended type questions, defined as "Who" type/format questions, "What" type/format questions, "When" type/format questions, "Where" type/format questions, "Why" type/format questions, and "How" type/format questions; rhetorical, or otherwise "unanswerable" questions; grammatically incorrect questions and/or queries; otherwise ill-formed questions; and/or closed-ended questions, capable of being answered with a simple "yes" or "no", or via a multi-choice, or mapping. As discussed above, closed-ended questions that are partially or substantially categorized as subject matter related questions are deemed to be mobile device answerable questions and are routed to a mobile question and answer queue, according to one embodiment. Also as discussed above, general knowledge/open-ended type questions may also selectively be routed to the mobile question and answer queue, based on attributes, subject matter, and answer length for those questions, according to one embodiment.

The operation 507 proceeds to operation 509, according to one embodiment.

At operation 509, the process defines substance-related question formats that have content that exceed a threshold level of substantive content, according to one embodiment. During a parsing and analysis of submitted questions, it may be determined that the content of the question is neither fully substantive nor fully product related. Therefore, according to one embodiment, a substance-related question format is one that has substantive content that exceeds a predetermined threshold level. The threshold level may be defined in terms of percentage and may include 25 percent substantive, 45 percent substantive, 65 percent substantive, or the like, according to various embodiments.

The operation 509 proceeds to operation 511, according to one embodiment.

At operation 511, the process defines concise answer question formats that are predicted to result in answers that will have answers within a threshold level of characters and content, according to one embodiment. In other words, a concise answer question format includes a question that can be answered within a threshold level of characters, it e.g., within 160 characters, according to one embodiment. The concise answer question format also includes answers that are within a threshold level of content, according to one embodiment. For example, the concise answer question format includes answers that do not contain web links, and includes answers to which responding users can respond without performing research, according to one embodiment.

The operation 511 proceeds to operation 513, according to one embodiment.

At operation 513, the process obtains user historical data and/or user profile data, according to one embodiment. As disclosed above, the user historical data can include, but is not limited to, information obtained about a user (e.g., an asking user) from the question and answer based customer support system, at least partially based on the prior use and searching activities of the user, according to one embodiment. The user profile data can include, but is not limited to, information obtained for/from an asking user or a seeking user, to support the user's use of the software system of operation 503, according to one embodiment.

The operation 513 proceeds to the operation 515, according to one embodiment.

At operation 515, the process receives question data representing a question submitted by a user through the question and answer based customer support system, according to one embodiment.

The operation 515 proceeds to operation 517, according to one embodiment.

At operation 517, before providing the question data to any of the one or more support personnel for the purpose of providing an answer to the question, the process analyzes the question data to determine if the question data represents a mobile device answerable question, according to one embodiment. As disclosed above, determination of mobile device answerable questions can include one or more combinations of question category, question attributes, question content, and/or question format, according to various embodiments. In one embodiment, a mobile device answerable question satisfies a concise answer question format and a substance-related question format.

The operation 517 proceeds to operation 519, according to one embodiment.

At operation 519, if a determination is made that the question data represents a mobile device answerable question, the process provides the question data to a mobile question and answer queue to facilitate response to the question with a mobile device and by the one or more support personnel. In one embodiment, the question and answer based customer support system maintains at least two question and answer queues, one for standard questions and one for mobile device answerable questions. In one embodiment, the standard question and answer queue and the mobile question and answer queue are logically separated within a single database by using one or more attributes to distinguish between the different questions. The mobile question and answer queue is provided to the one or more support personnel to prioritize and/or facilitate response generation by the one or more support personnel for the unanswered questions hosted within the mobile question and answer queue, according to one embodiment.

The operation 519 proceeds to operation 521, where the process ends, according to one embodiment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A system comprising:
   at least one processor; and
   at least one memory coupled to the at least one processor, the at least one memory having stored therein instructions which, when executed by the at least one processor, control one or more operations of:
      a user interface configured to receive question data entered by one or more users, and to provide the received question data to one or more support personnel associated with a question and answer based customer support system;
      a database configured to store questions and associated answers generated at least in part on previously addressed concerns, the database including a mobile queue dedicated for storing questions answerable by support personnel using mobile devices;
      a predictive model trained using historical question and answer data and configured to estimate, for a respective one of the received questions, a length of the associated answer, a likelihood that the associated answer includes a web link, and a likelihood that a question answerer needs to perform research to answer the respective question; and
      a question analysis module configured to:
         determine a subject matter of the question data using the predictive model; determine that the respective question is a mobile device answerable question based at least in part on the estimated length of the associated answer being less than a predetermined number of characters and the estimated likelihood that the question answerer needs to perform research being less than a value; and
         route the determined mobile device answerable question to the mobile queue of the database.

2. The system of claim 1, wherein the predetermined number of characters is 160.

3. The system of claim 1, wherein the question analysis module is further configured to determine that the respective answer comprises the mobile device answerable question based on the estimated likelihood that the associated answer includes a web link being less than another value.

4. The system of claim 1, wherein the question analysis module is further configured to route the respective question to the mobile queue of the database based on the determined subject matter of the respective question.

5. The system of claim 1, wherein the predictive model is trained using user historical data and one or more of existing question and answer data, user profile data, user interactions with a software system, or feedback data received from the one or more support personnel reviewing the question data.

6. The system of claim 5, wherein the software system comprises at least one of:
- a computing system implemented tax preparation software system;
- a network accessed tax preparation software system;
- a web-based tax preparation software system;
- a cloud-based tax preparation software system;
- a computing system implemented business management software system;
- a network accessed business management software system;
- a web-based business management software system;
- a cloud-based business management software system;
- a computing system implemented accounting software system;
- a network accessed accounting software system;
- a web-based accounting software system;
- a cloud-based accounting software system;
- a computing system implemented financial management system;
- a network accessed financial management system;
- a web-based financial management system; or
- a cloud-based financial management system.

7. The system of claim 1, wherein the database includes another queue for storing questions that are not answerable by the one or more support personnel using mobile devices.

8. The system of claim 7, wherein the question analysis module is further configured to route questions not determined to be mobile device answerable questions to the other queue.

9. The system of claim 7, wherein questions stored in the mobile queue have a higher priority than questions stored in the other queue.

10. The system of claim 1, wherein the mobile queue is configured to prioritize mobile device answerable questions over other questions for support personnel who access questions stored in the mobile queue using mobile devices.

11. The system of claim 1, wherein the predictive model is trained to estimate the length of the associated answer based on one or more of existing question and answer data, user historical data, user profile data, user interaction history with the question and answer based customer support system, or feedback data received from support personnel reviewing the question data.

* * * * *